United States Patent
Lee et al.

(10) Patent No.: US 11,954,938 B2
(45) Date of Patent: Apr. 9, 2024

(54) FINGERPRINT SENSOR PACKAGE AND SMART CARD INCLUDING FINGERPRINT SENSOR PACKAGE

(71) Applicant: SAMSUNG ELECTRONICS CO., LTD., Suwon-si (KR)

(72) Inventors: Gwangjin Lee, Suwon-si (KR); Jaehyun Lim, Suwon-si (KR); Heeyoub Kang, Suwon-si (KR); Hyunjong Moon, Suwon-si (KR); Yun Seok Choi, Suwon-si (KR); Inho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/131,133

(22) Filed: Apr. 5, 2023

(65) Prior Publication Data

US 2024/0046692 A1    Feb. 8, 2024

(30) Foreign Application Priority Data

Aug. 3, 2022    (KR) .................... 10-2022-0096704

(51) Int. Cl.
*G06V 40/13*    (2022.01)
*G06K 19/073*    (2006.01)
*G06K 19/077*    (2006.01)

(52) U.S. Cl.
CPC ... *G06V 40/1306* (2022.01); *G06K 19/07354* (2013.01); *G06K 19/07747* (2013.01)

(58) Field of Classification Search
CPC ......... G06V 40/1306; G06K 19/07354; G06K 19/07747
See application file for complete search history.

(56) References Cited

U.S. PATENT DOCUMENTS

| | | | |
|---|---|---|---|
| 9,129,873 B2 | 9/2015 | Kim et al. | |
| 9,773,153 B1 | 9/2017 | Slottner | |
| 9,847,254 B2 | 12/2017 | Lin | |
| 9,875,388 B2 | 1/2018 | Yu et al. | |
| 10,395,164 B2 | 8/2019 | Lundberg et al. | |
| 10,769,405 B2 | 9/2020 | Pompeani et al. | |
| 2016/0210496 A1* | 7/2016 | Lin | H01L 23/3135 |
| 2018/0181738 A1* | 6/2018 | Huang | G06V 40/1306 |
| 2020/0184173 A1 | 6/2020 | Jiang et al. | |
| 2021/0150175 A1 | 5/2021 | Lundberg et al. | |
| 2022/0270394 A1* | 8/2022 | Su | G06V 40/1329 |

* cited by examiner

*Primary Examiner* — Premal R Patel
(74) *Attorney, Agent, or Firm* — Sughrue Mion, PLLC

(57) ABSTRACT

A fingerprint sensor package includes a first substrate having a core insulating layer with a first surface and a second surface, and a through-hole passing through the first surface and the second surface, a first bonding pad disposed on the second surface of the core insulating layer, and an external connection pad, a second substrate disposed in the through-hole of the core insulating layer and including a plurality of first sensing patterns, a plurality of second sensing patterns, and a second bonding pad, a conductive wire connecting the first bonding pad and the second bonding pad to each other, a controller chip disposed on the second substrate, and a molding layer disposed on the second surface of the core insulating layer, filling the through-hole, covering the second substrate and the first bonding pad, and spaced apart from the external connection pad.

20 Claims, 22 Drawing Sheets

FINGERPRINT SENSOR PACKAGE AND SMART CARD INCLUDING FINGERPRINT SENSOR PACKAGE

CROSS-REFERENCE TO RELATED APPLICATION(S)

This application claims priority to Korean Patent Application No. 10-2022-0096704, filed on Aug. 3, 2022, in the Korean Intellectual Property Office, the disclosure of which is incorporated herein by reference in its entirety.

BACKGROUND

The present disclosure relates to a fingerprint sensor package and a smart card including the same.

Fingerprint recognition technology has been used to prevent various security breaches through registration and authentication procedures by recognizing a fingerprint of a user. In particular, such technology has been applied to network defense of individuals and organizations, the protection of various contents and data, and to secure access to financial information. A fingerprint sensor acquires fingerprint information of a user using an optical method, a capacitive method, an ultrasonic method, a thermal sensing method, or the like. A recent trend within the fingerprint sensor industry is to achieve low cost while continuously reducing a size and thickness of a product. Accordingly, a fingerprint sensor package may be required to improve reliability and sensitivity of the acquired fingerprint information, reduce an overall size and height, and satisfy economic feasibility.

SUMMARY

One or more example embodiments provide a fingerprint sensor package with improved reliability and a smart card including the same, so as to prevent a financial accident caused by theft or loss of the smart card.

According to an aspect of an example embodiment, a fingerprint sensor package includes: a first substrate comprising a core insulating layer having a first surface and a second surface opposing each other, the first substrate further comprising a through-hole passing through the first surface and the second surface, a first bonding pad disposed on the second surface of the core insulating layer along a circumference of the through-hole, and an external connection pad disposed between an edge of the second surface of the core insulating layer and the first bonding pad; a second substrate disposed in the through-hole of the core insulating layer and comprising a plurality of first sensing patterns disposed in the through-hole of the core insulating layer, the plurality of first sensing patterns being spaced apart from each other in a first direction and extending in a second direction intersecting the first direction, a plurality of second sensing patterns spaced apart from each other in the second direction and extending in the first direction, and a second bonding pad; a conductive wire connecting the first bonding pad and the second bonding pad; a controller chip disposed on the second substrate; and a molding layer disposed on the second surface of the core insulating layer, filling the through-hole, covering the second substrate and the first bonding pad, and spaced apart from the external connection pad.

According to an aspect of an example embodiment, a fingerprint sensor package includes: a first substrate comprising a core insulating layer having a first surface and a second surface opposing each other, the first substrate further comprising a through-hole passing through the first surface and the second surface, a ground bezel disposed on the first surface of the core insulating layer along a circumference of the through-hole, a first bonding pad disposed on the second surface of the core insulating layer along the circumference of the through-hole, and an external connection pad disposed between an edge of the second surface of the core insulating layer and the first bonding pad; a second substrate disposed in the through-hole of the core insulating layer and comprising a plurality of first sensing patterns spaced apart from each other in a first direction and extending in a second direction intersecting the first direction, a plurality of second sensing patterns spaced apart from each other in the second direction and extending in the first direction, and a second bonding pad; a conductive wire connecting the first bonding pad and the second bonding pad; a controller chip disposed on the second substrate; connection bumps disposed between the second substrate and the controller chip and electrically connecting the second substrate and the controller chip; and a molding layer covering the second substrate and the controller chip, filling a space between the through-hole and a side surface of the second substrate, and extending to a boundary between the second bonding pad and the external connection pad, wherein the plurality of first sensing patterns and the plurality of second sensing patterns are spaced apart from each other in a third direction perpendicular to the first and second directions, and the plurality of first sensing patterns and the plurality of second sensing patterns are included in a plurality of capacitors.

According to an aspect of an example embodiment, a smart card includes: a card body comprising a groove region and a connection pad; a security chip disposed in the card body; and a fingerprint sensor package configured to sense a fingerprint of a user and to transmit a signal related to a sensing result to the security chip, wherein the fingerprint sensor package comprises: a first substrate comprising a core insulating layer having a first surface and a second surface opposing each other, the first substrate further comprising a through-hole passing through the first surface and the second surface, a first bonding pad disposed on the second surface of the core insulating layer along a circumference of the through-hole, and an external connection pad disposed between an edge of the second surface of the core insulating layer and the first bonding pad; a second substrate disposed in the through-hole of the core insulating layer, the second substrate comprising a plurality of first sensing patterns spaced apart from each other in a first direction, and extending in a second direction intersecting the first direction, a plurality of second sensing patterns spaced apart from each other in the second direction and extending in the first direction, and a second bonding pad; a conductive wire connecting the first bonding pad and the second bonding pad; a controller chip disposed on the second substrate; and a molding layer disposed on the second surface of the core insulating layer, filling the through-hole, covering the second substrate and the first bonding pad, and spaced apart from the external connection pad, wherein the external connection pad of the first substrate is bonded to the connection pad of the card body.

BRIEF DESCRIPTION OF DRAWINGS

The above and other aspects and features will be more apparent from the following description of example embodiments, taken in conjunction with the accompanying drawings, in which.

DETAILED DESCRIPTION

Example embodiments will be described more fully with reference to the accompanying drawings, in which example embodiments are shown. Embodiments described herein are provided as examples, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
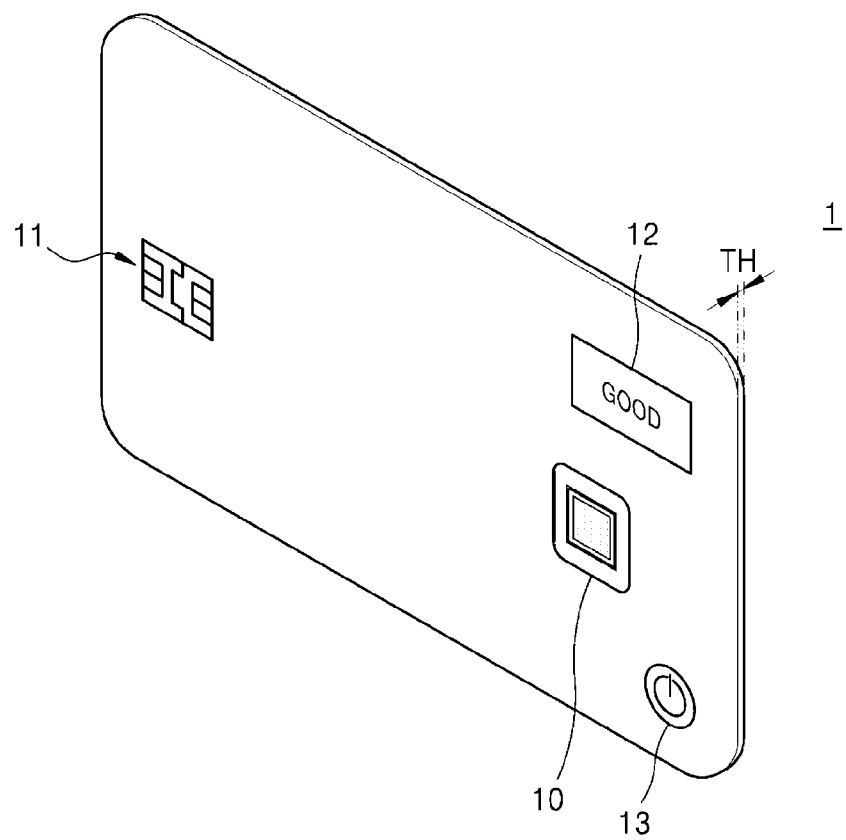
FIG. 1 is a schematic perspective view illustrating a smart card according to an example embodiment of the present disclosure.

FIG. 1 is a schematic perspective view illustrating a smart card 1 according to an example embodiment of the present disclosure.

Referring to FIG. 1, the smart card 1 may include a fingerprint sensor package 10, a security chip 11, a display 12, and a power button 13.

The smart card 1 may further include information displayed on a conventional credit card or debit card, such as a card number identifier, an expiration date identifier, and a user name. In some example embodiments, the smart card 1 may further include an RF chip.

When a user brings his or her fingerprint into contact with a fingerprint sensor, the fingerprint sensor package 10 may recognize the fingerprint. The fingerprint sensor package 10 may compare the recognized fingerprint and a registered fingerprint to determine whether the recognized fingerprint corresponds to the registered fingerprint. The fingerprint sensor package 10 may be configured to operate after the smart card 1 is switched to an ON state.

The security chip 11 may store encrypted financial information. When the recognized fingerprint and the registered fingerprint correspond to each other, the security chip 11 may grant a payment right to the user of the smart card 1. For example, the smart card 1 may prevent a financial accident caused by theft or loss by granting, by the security chip 11, the payment right to the user based on a recognition result of the fingerprint sensor package 10.

The display 12 may display whether the recognized fingerprint corresponds to the registered fingerprint, whether the smart card 1 is ON or OFF, and the like. The display 12 may display letters, numbers, special symbols, and the like, and may further include a light emitter in some cases. However, in some example embodiments the display 12 may be omitted depending on a type of the smart card 1.

The power button 13 may turn the smart card 1 on/off. The smart card 1 in an OFF state may be switched to an ON state by operation of the power button 13, and the smart card 1 in the ON state may be switched to the OFF state by operation of the power button 13. In addition, when a set period of time elapses after the smart card 1 is switched to the ON state, the smart card 1 may be automatically switched to the OFF state. However, in some example embodiments the power button 13 may be omitted depending on the type of the smart card 1.

In some example embodiments, a thickness TH of the smart card 1 may have a range from about 0.5 mm to about 1 mm. In addition, the thickness TH of the smart card 1 may be about 0.84 mm or less according to international standards. For example, the thickness TH of the smart card 1 may be about 0.76 mm or less.

The smart card 1 according to an example embodiment may include the fingerprint sensor package 10, and have the same level of thickness as that of the conventional credit card or debit card, thereby providing the user with a high level of security while maintaining a way in which the conventional credit or debit card is used. A cross-sectional view of the smart card 1 according to the example embodiment shown in FIG. 1 may be substantially the same as or similar to that schematically illustrated in FIG. 9H.

FIGS. 2A to 2E are diagrams illustrating a fingerprint sensor package 10 according to example embodiments of the present disclosure.

Figure 2A:
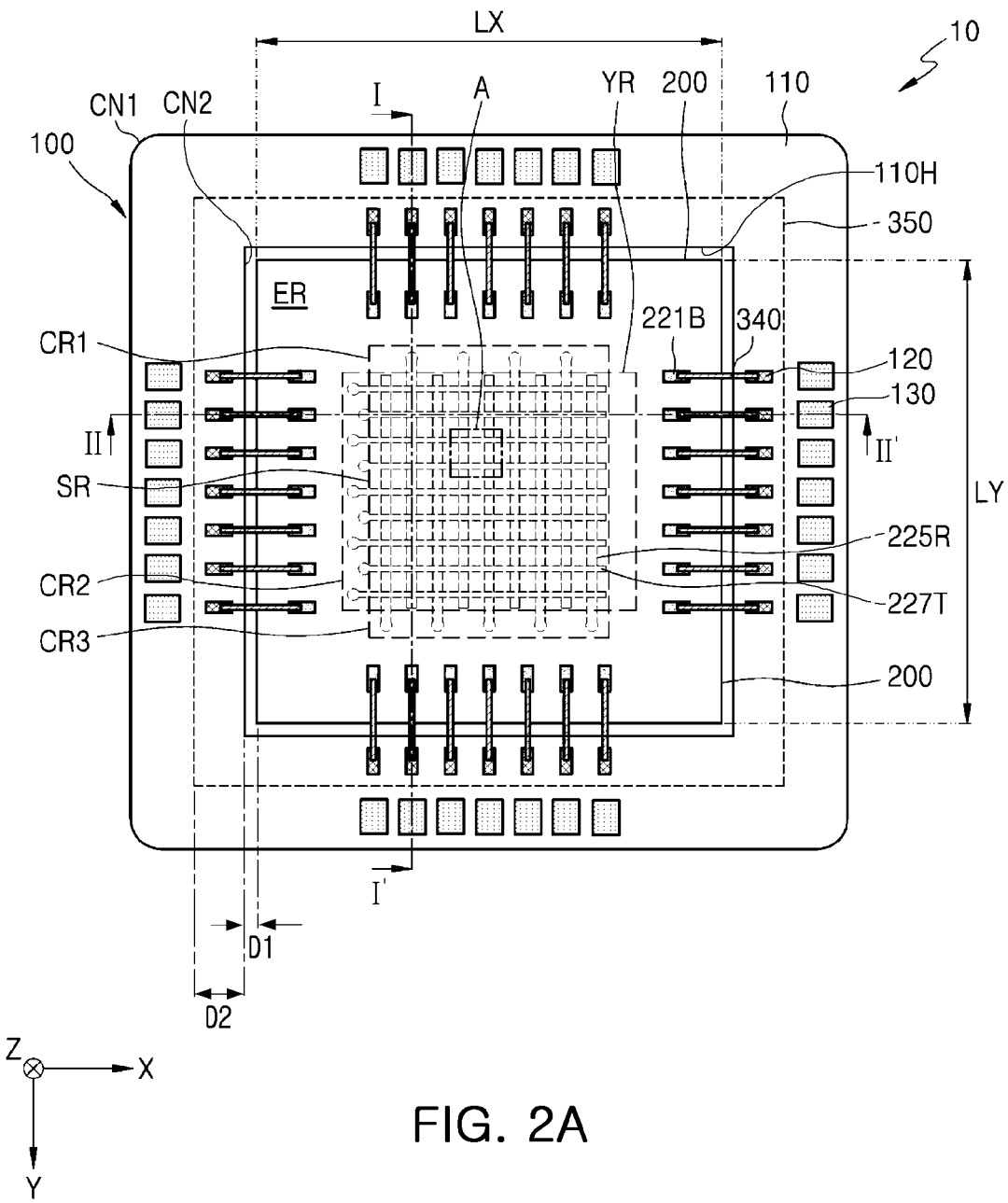
FIGS. 2A to 2E are diagrams illustrating a fingerprint sensor package according to an example embodiment of the present disclosure.
Figure 2B:
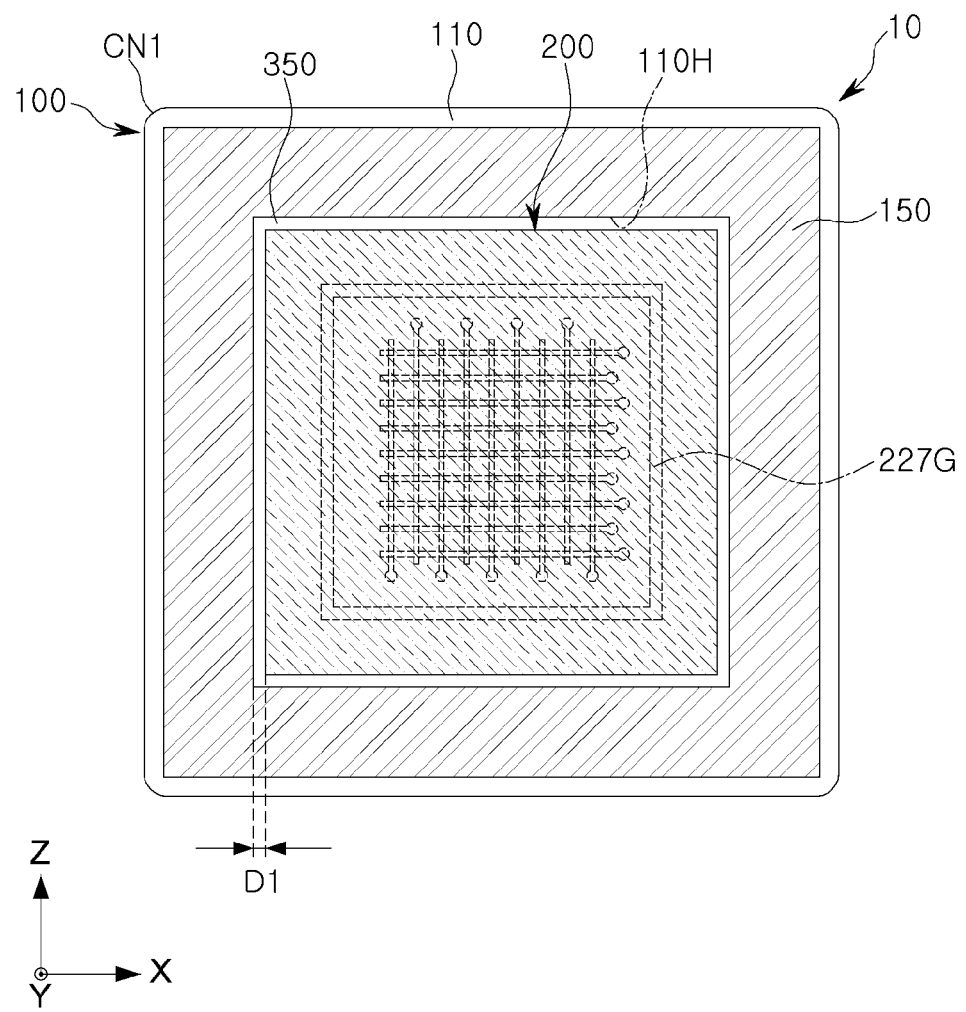
Figure 2C:
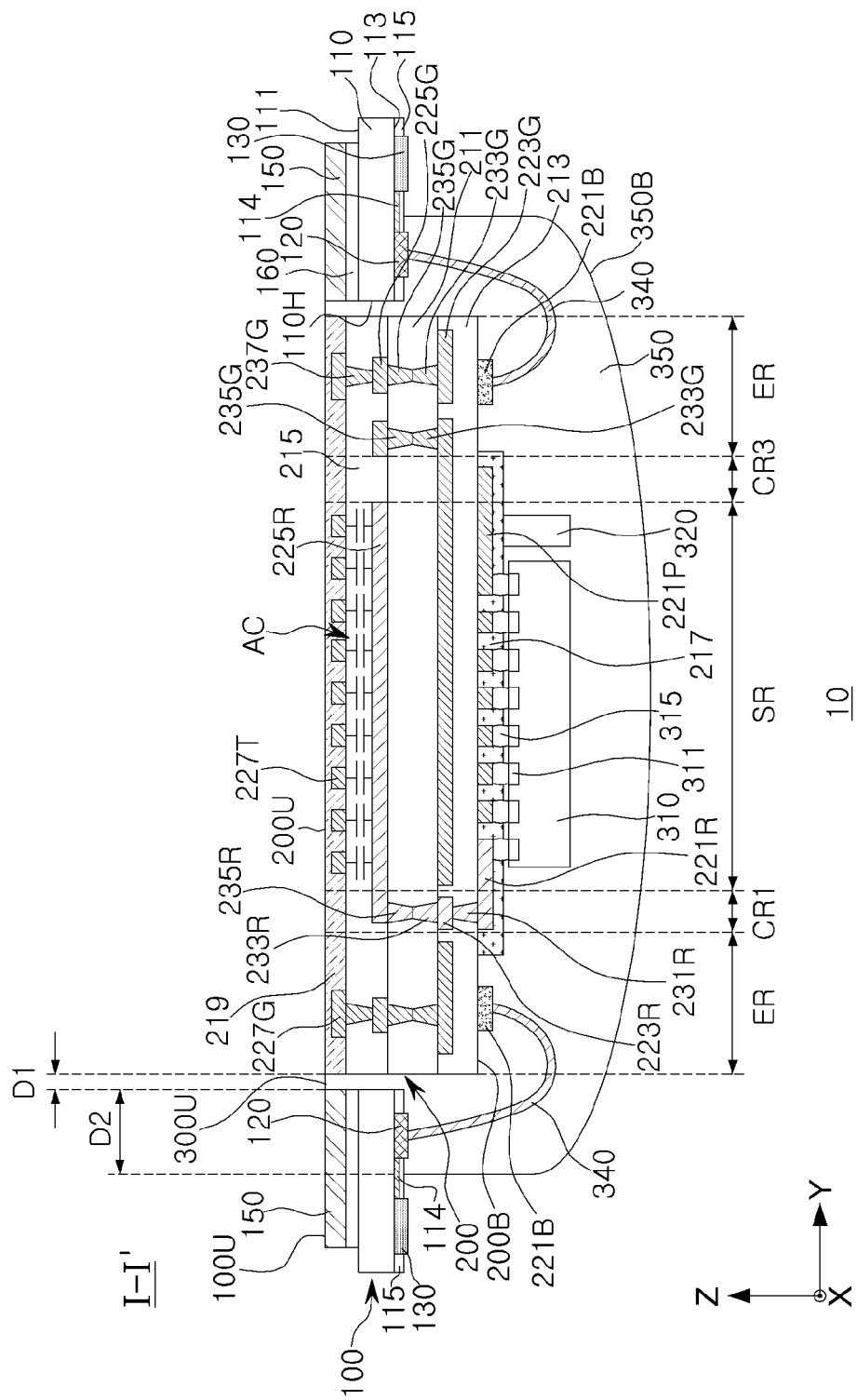
Figure 2D:
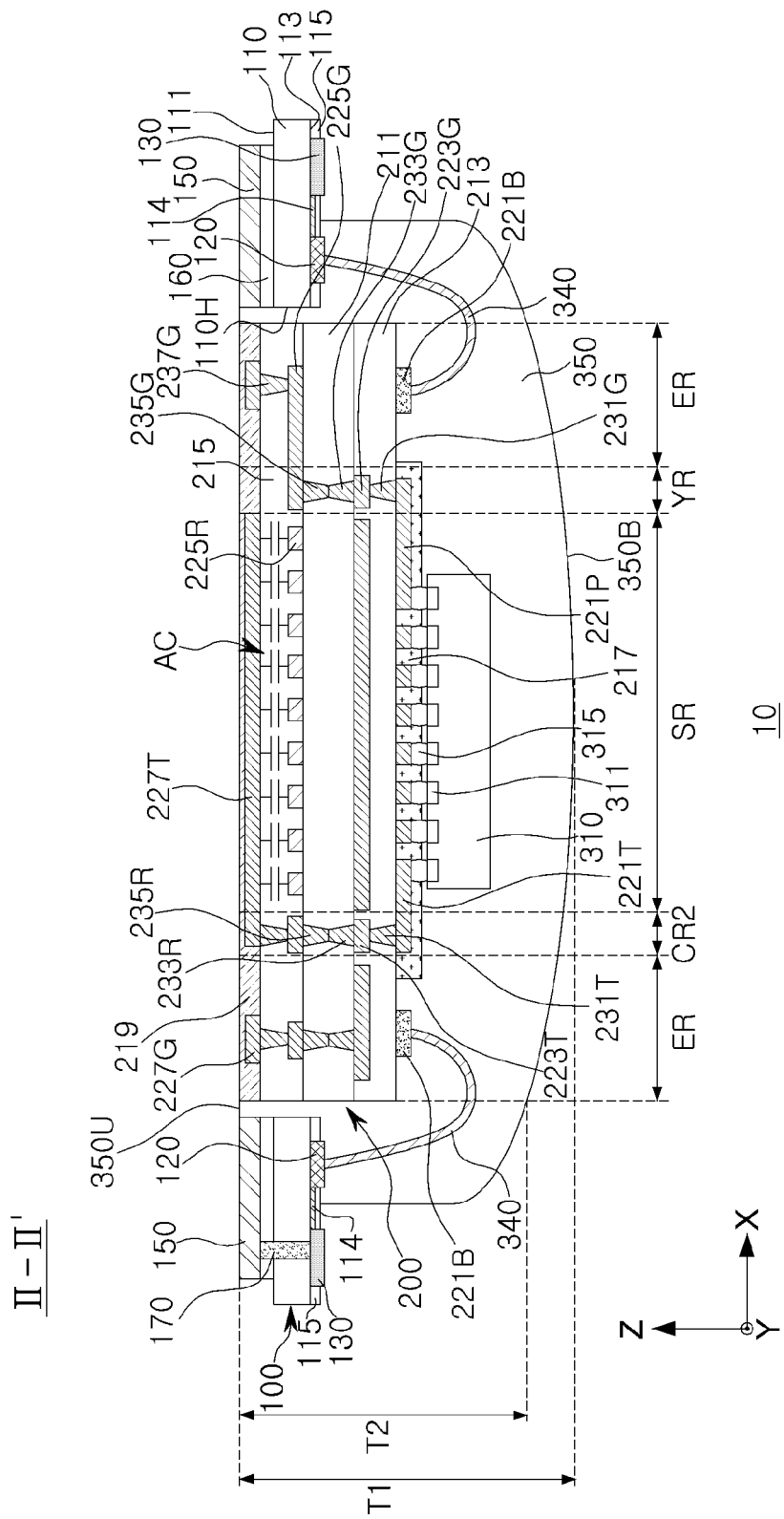
Figure 2E:
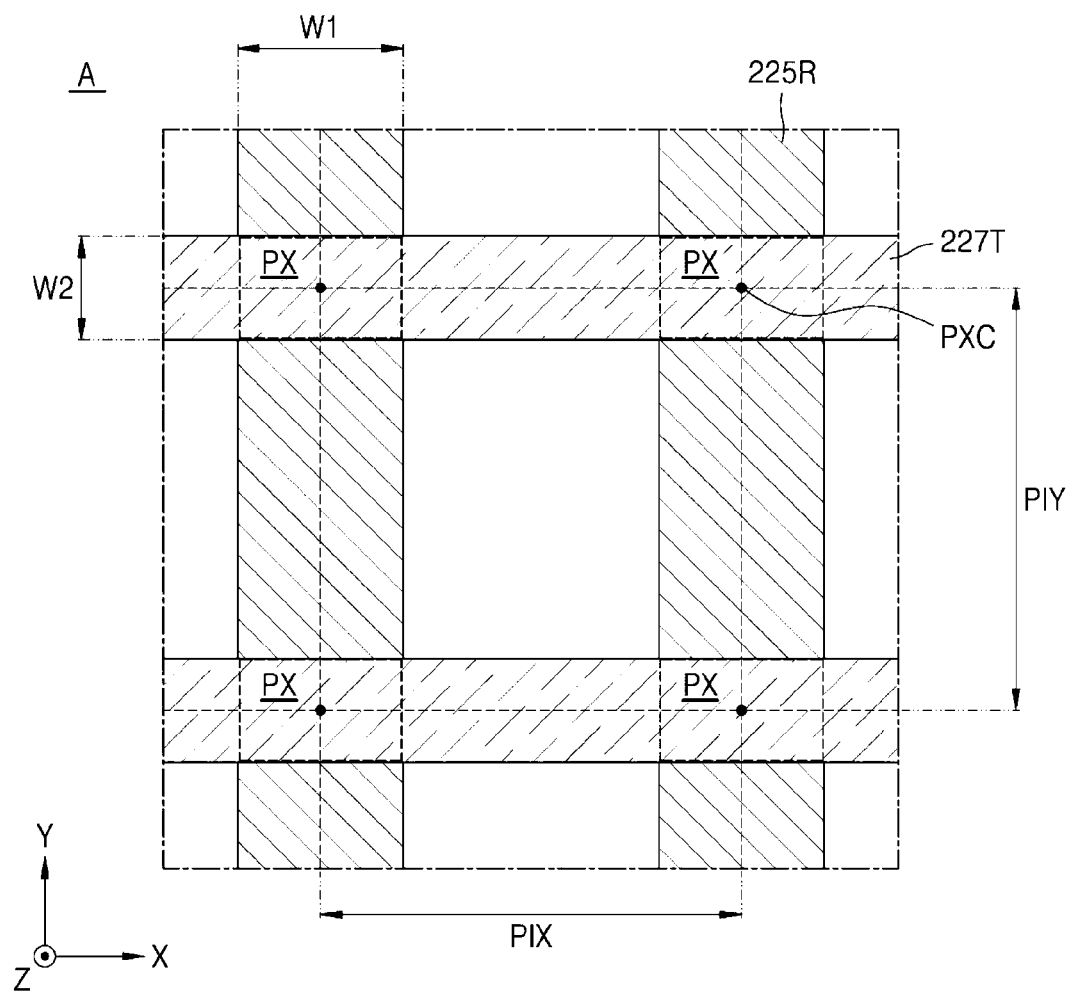

Specifically, FIG. 2A is a bottom view schematically illustrating a layout of some components of the fingerprint sensor package 10. FIG. 2B is a plan view illustrating the fingerprint sensor package 10 of FIG. 2A. FIG. 2C is a cross-sectional view taken along the line I-I' of FIG. 2A. FIG. 2D is a cross-sectional view taken along the line II-IF of FIG. 2A. FIG. 2E is an enlarged view illustrating a region indicated by "A" of FIG. 2A.

Referring to FIGS. 2A to 2E, the fingerprint sensor package 10 may include a first substrate 100, a second substrate 200, a controller chip 310, a passive device 320, and a molding layer 350.

A total thickness of the fingerprint sensor package 10 according to an example embodiment may be about 0.76 mm or less. In some example embodiments, the total thickness of the fingerprint sensor package 10 may be about 0.5 mm or less. For example, the total thickness of the fingerprint sensor package 10 may have a range from about 0.1 mm to about 0.4 mm. Accordingly, the fingerprint sensor package 10 may be easily applied to various products (for example, the smart card described above) that may be bent or that may require a small thickness, for example.

The first substrate 100 may include a core insulating layer 110, first bonding pads 120, external connection pads 130, a ground bezel 150, and an adhesive layer 160. The first substrate 100 may include a printed circuit board (PCB). In example embodiments, the first substrate 100 may include a flexible PCB (FPCB) having flexibility so as to be bendable. In other example embodiments, the first substrate 100 may include a rigid type PCB.

The core insulating layer 110 may have, for example, a substantially rectangular planar shape or a square planar shape, and may be provided in the form of a flexible film or plate. The core insulating layer 110 may include a first surface 111 and a second surface 113 opposing each other. Here, a direction, parallel to a pair of edges of the core insulating layer 110, may be defined as a first direction (X-direction), a direction, parallel to another pair of edges, may be defined as a second direction (Y-direction), and a direction, perpendicular to a main surface (the first surface 111 or the second surface 113) of the core insulating layer 110, may be defined as a third direction (Z-direction).

The core insulating layer 110 may include an insulating material. For example, the core insulating layer 110 may be a flexible film including polyimide. For example, the core insulating layer 110 may be formed of an epoxy-based resin or a synthetic resin such as acryl, polyether nitrile, polyether sulfone, polyethylene terephthalate, or polyethylene naphthalate.

A through-hole 110H passing through the first surface 111 and the second surface 113 may be formed in a substantially central portion of the core insulating layer 110. The second substrate 200 may be accommodated in the through-hole 110H, and the through-hole 110H may be formed to be larger than the second substrate 200 such that a sidewall of the through-hole 110H and a sidewall of the second substrate 200 are not in contract with each other. In example embodiments, a first distance D1 between the sidewall of the through-hole 110H and the sidewall of the second substrate 200 may have a range of about mm to about 3.0 mm. The through-hole 110H may be formed to have a substantially rectangular shape or a substantially square shape, for example.

The first bonding pads 120 may be disposed around the through-hole 110H on the second surface 113 of the core insulating layer 110. For example, the first bonding pads 120 may be arranged along at least one of edges of the through-hole 110H of the core insulating layer 110. The first bonding pads 120 may be connected to conductive wires 340, and may be electrically connected to the second bonding pads 221B of the second substrate 200 through the conductive wires 340.

The external connection pads 130 may be disposed on the second surface 113 of the core insulating layer 110. The external connection pads 130 may be disposed adjacent to an edge of the second surface 113 of the core insulating layer 110, and may be arranged along the edge of the second surface 113 of the core insulating layer 110. The external connection pads 130 may be closer to the edge of the second surface 113 of the core insulating layer 110 than the first bonding pad 120. That is, a distance between the edge of the second surface 113 of the core insulation layer 110 and the external connection pads 130 may be shorter than a distance between the edge of the second surface 113 of the core insulation layer 110 and the first bonding pad 120. The external connection pads 130 may be pads electrically and physically connected to an external device (for example, a card body 500 of FIG. 9G). The external connection pads 130 may be electrically connected to the first bonding pads 120 through a conductive pattern 114 provided on the second surface 113 of the core insulating layer 110. An insulating layer 115 covering the conductive pattern 114 may be disposed on the second surface 113 of the core insulating layer 110.

For example, the first bonding pads 120 and the external connection pads 130 may be formed of at least one selected from among copper (Cu), aluminum (Al), nickel (Ni), silver (Ag), gold (Au), platinum (Pt), tin (Sn), lead (Pb), titanium (Ti), chromium (Cr), palladium (Pd), indium (In), zinc (Zn), carbon (C), and alloys thereof.

The ground bezel 150 may be disposed on the first surface 111 of the core insulating layer 110 and disposed around the through-hole 110H. When the through-hole 110H is formed on a substantially central portion of the first surface 111 of the core insulating layer 110, the ground bezel 150 may be formed on an outer portion of the first surface 111 of the core insulating layer 110. The ground bezel 150 may be disposed around the through-hole 110H to reduce sensing noise while a fingerprint of a user is in contact with an upper surface of the second substrate 200 accommodated in the through-hole 110H. For example, the ground bezel 150 may include a conductive material, for example, a metal such as copper (Cu) or aluminum (Al).

The ground bezel 150 may be electrically grounded. In example embodiments, the ground bezel 150 may be configured to receive a reference potential through the conductive via 170 passing through the core insulating layer 110 and the adhesive layer 160. The conductive via 170 may be configured to electrically connect the ground bezel 150 and the external connection pads 130 to each other, and may be used as an electrical path for transferring the reference potential to the ground bezel 150.

The ground bezel 150 may extend along a circumference of the through-hole 110H. The ground bezel 150 may have a ring shape surrounding the through-hole 110H in a planar manner. In example embodiments, the ground bezel 150 may be aligned to be substantially coplanar with the sidewall of the through-hole 110H. In addition, in example embodiments, the ground bezel 150 may be spaced apart from the through-hole 110H.

In example embodiments, the first substrate 100 may have a shape in which all outer corners CN1 is rounded. In some example embodiments, a radius of curvature of each of the outer corners CN1 of the first substrate 100 may have a range of about 0.1 mm to about 2 mm. For example, the radius of curvature of each of the outer corners CN1 of the first substrate 100 may be about 1 mm. The outer corners CN1 of the first substrate 100 may have a rounded shape to effectively prevent cracks that may occur at the outer corners CN1 while the first panel substrate 100P is cut using a punching facility PM in FIG. 9F.

The second substrate 200 may have a substantially rectangular planar shape or a substantially square planar shape. The second substrate 200 may include an upper surface 200U and a lower surface 200B and the upper surface 200U and the lower surface 200B may oppose each other. The upper surface 200U of the second substrate 200 may be a surface contacted for fingerprint recognition, and the lower surface 200B of the second substrate 200 may be a surface on which a component such as the controller chip 310 or the like are mounted. The second substrate 200 may be accommodated in the through-hole 110H of the first substrate 100 and may be electrically connected to the first substrate 100 through the conductive wires 340. A first length LX of the second substrate 200 in a first direction (X-direction) may have a range of about 10 mm to about 15 mm. In addition, a second length LY in a second direction (Y-direction) of the second substrate 200 may have a range of about 10 mm to about 15 mm. For example, the first length LX of the second substrate 200 may be about 12.7 mm, and the second length LY may be about 12.7 mm.

The upper surface 200U of the second substrate 200 may be disposed to be substantially coplanar with the upper surface 100U of the first substrate 100. Accordingly, when the fingerprint of the user comes into contact with the upper surface 100U of the first substrate 100, the fingerprint of the user may be naturally connected to the ground bezel 150 disposed on the upper surface 200U of the second substrate 200. However, in some example embodiments, the upper surface 200U of the second substrate 200 may be disposed to have a level higher or lower than that of the upper surface 100U of the first substrate 100.

Referring to FIG. 2A, the second substrate 200 may include a sensing region SR, a first contact region CR1, a second contact region CR2, a third contact region CR3, a wiring region YR, and a peripheral region ER.

Referring to FIG. 2C, the second substrate 200 may include a base layer 211, a lower insulating layer 213 on a lower surface of the base layer 211, an upper insulating layer 215 on an upper surface of the base layer 211, a lower protective layer 217 on a lower surface of the lower insulating layer 213, and an upper protective layer 219 on an upper surface of the upper insulating layer 215.

The second substrate 200 may include a PCB. In example embodiments, the second substrate 200 may include a rigid type substrate.

The second substrate 200 may include a multilayered PCB including a plurality of conductive layers. The second substrate 200 may include conductive layers positioned on different vertical levels, and conductive vias for electrically connecting the conductive layers to each other. The conductive layers and the conductive vias may include at least one selected from among copper (Cu), aluminum (Al), nickel (Ni), silver (Ag), gold (Au), platinum (Pt), tin (Sn), lead (Pb), titanium (Ti), chromium (Cr), palladium (Pd), indium (In), zinc (Zn), carbon (C), and alloys thereof.

For example, the second substrate 200 may include first conductive layers 221B, 221G, 221R, 221T, and 221P, second conductive layers 223G, 223R, and 223T, third conductive layers 225G, 225R, and 225T, and fourth conductive layers 227G and 227T in an order in which a distance from the upper surface 200U decreases. The first conductive layers 221B, 221G, 221R, 221T, and 221P may be on the lower surface of the lower insulating layer 213. The second conductive layers 223G, 223R, 223T may be on the lower surface of the base layer 211. The third conductive layers 225G, 225R, and 225T may be on the upper surface of the base layer 211. The fourth conductive layers 227G and 227T may be on the upper surface of the upper insulating layer 215.

The first conductive layers 221B, 221G, 221R, 221T, and 221P may include second bonding pads 221B, first-first sensing pads 221R, first-second sensing pads 221T, a first ground pattern 221G, and a power pattern 221P. The second conductive layers 223G, 223R, and 223T may include second-first sensing pads 223R, second-second sensing pads 223T, and a second ground pattern 223G. The third conductive layers 225G, 225R, and 225T may include first sensing patterns 225R, third-second sensing pads 225T, and a third ground pattern 225G. The fourth conductive layers 227G and 227T may include second sensing patterns 227T and a fourth ground pattern 227G.

In addition, the second substrate 200 may include first conductive vias 231G, 231R, and 231T for electrically connecting, to each other, the first conductive layers 221B, 221G, 221R, 221T, and 221P and second conductive layers 223G, 223R, 223T, second conductive vias 233G, 233R, and 233T and third conductive vias 235G, 235R, and 235T for electrically connecting, to each other, the second conductive layers 223G, 223R, and 223T and the third conductive layers 225G, 225R, and 225T, and fourth conductive vias 237T and 237G for electrically connecting, to each other, the third conductive layers 225G, 225R, and 225T and the fourth conductive layers 227G and 227T. The first conductive vias 231G, 231R, and 231T may at least partially pass through the lower insulating layer 213. The second conductive vias 233G, 233R, and 233T may partially pass through the base layer 211. The third conductive vias 235G, 235R, and 235T may partially pass through the base layer 211. The fourth conductive vias 237T and 237G may at least partially pass through the upper insulating layer 215.

The first conductive vias 231G, 231R, and 231T may include first-first sensing vias 231R for electrically connecting, to each other, the first-first sensing pads 221R and the second-first sensing pads 223R, first-second sensing vias 231T for electrically connecting, to each other, the first-second sensing pads 221T and the second-second sensing pads 223T, a first ground via 231G for electrically connecting, to each other, the first ground pattern 221G and the second ground pattern 223G. In example embodiments, the first conductive vias 231G, 231R, and 231T may have a tapered structure in which a horizontal width thereof decreases toward the base layer 211.

The second conductive vias 233G, 233R, and 233T may include second-first sensing vias 233R for electrically connecting, to each other, the second-first sensing pads 223R and the first sensing patterns 225R, second-second sensing vias 233T for electrically connecting, to each other, the second-second sensing pads 223T and the third-second sensing pads 225T, and a second ground via 233G for electrically connecting, to each other, the second ground pattern 223G and the third ground pattern 225G. The third conductive vias 235G, 235R, and 235T may include third-first sensing vias 235R for electrically connecting, to each other, the second-first sensing pads 223R and the first sensing patterns 225R, third-second sensing vias 235T for electrically connecting, to each other, the second-second sensing pads 223T and the third-second sensing pads 225T, and a third ground via 235G for electrically connecting, to each other, the second ground pattern 223G and the third ground pattern 223G.

The second conductive vias 233G, 233R, and 233T may be in contact with the second conductive layer 223G, 223R, and 223T. The third conductive vias 235G, 235R, and 235T may be in contact with the third conductive layer 225G, 225R and 225T. The second conductive vias 233G, 233R, and 233T and the third conductive vias 235G, 235R, and 235T may be in contact with each other. Specifically, the second-first sensing pads 233R and the first sensing patterns 225R may be electrically connected to each other by the second-first sensing vias 233R and the third-first sensing vias 235R vertically connected to each other. The second-second sensing pads 223T and the third-second sensing pads 225T may be electrically connected to each other by the second-second sensing vias 233T and third-second sensing vias 235T vertically connected to each other. The second ground pattern 223G and the third ground pattern 225G may be electrically connected to each other by the second ground via 233G and the third ground via 235G vertically connected to each other.

In example embodiments, the second conductive vias 233G, 233R, and 233T and the third conductive vias 235G, 235R, and 235T may respectively have a tapered structure in which a horizontal width thereof decreases toward a central portion in a thickness direction of the base layer 211. In some example embodiments, the second conductive vias 233G, 233R, and 233T and the third conductive vias 235G, 235R, and 235T may have a minimum horizontal width at a contact surface therebetween.

The fourth conductive vias 237T and 237G may include fourth-second sensing vias 237T for electrically connecting, to each other, the third-second sensing pads 225T and the second sensing patterns 227T, and a fourth ground via 237G for electrically connecting, to each other, the third ground pattern 225G and the fourth ground pattern 227G. In example embodiments, the fourth conductive vias 237T and 237G may have a tapered structure in which a horizontal width thereof decreases toward the base layer 211.

Referring to FIG. 2A, the second substrate 200 may include the sensing region SR, the first contact region CR1, the second contact region CR2, the third contact region CR3, the wiring region YR, and the peripheral region ER. Specifically, the sensing region SR may be a region in which the first and second sensing patterns 225R and 227T for fingerprint recognition are disposed. Referring to FIG. 2C, the first contact region CR1 and the third contact region CR3 may be regions in which the first-first sensing vias 231R the second-first sensing vias 233R, and the third-first sensing vias 235R for connecting, to each other, the first sensing patterns 225R and the controller chip 310, are disposed. Referring to FIG. 2D, the second contact region CR2 may be a region in which the first-second sensing vias 231T, the second-second sensing vias 233T, the third-second sensing vias 235T, and fourth-second sensing vias 237T for connecting, to each other, the second sensing patterns 227T and the controller chip 310, are disposed. The wiring region YR may be a region in which at least some of the first to fourth ground vias 231G, 233G, 235G, and 237G for connecting, to each other, the fourth ground pattern 227G and the controller chip 310 are disposed.

Referring to FIGS. 2A and 2E, the sensing region SR may be disposed in a central portion of the second substrate 200. In some example embodiments, the sensing region SR may have a rectangular or square shape in plan view. In the sensing region SR, a plurality of line-shaped first sensing patterns 225R spaced apart from each other in the first direction (X-direction) and extending in the second direction (Y-direction) and a plurality of lined-shaped second sensing patterns 227T spaced apart from each other in the second direction (Y-direction) and extending in the first direction (X-direction) may be disposed.

The first contact region CR1 may be formed at one end of the sensing region SR in the second direction (Y-direction), and the third contact region CR3 may be formed at the other end of the sensing region SR in the second direction (Y-direction). In addition, the second contact region CR2 may be formed at one end of the sensing region SR in the first direction (X-direction), and the wiring region YR may be formed at the other end of the sensing region SR in the first direction (X-direction).

The peripheral region ER may be disposed on an outer portion of the second substrate 200. The peripheral region ER may surround the sensing region SR in a plan view. The second bonding pads 221B may be disposed in the peripheral region ER. The first to fourth ground patterns 221G, 223G, 225G, and 227G for providing a reference potential and shielding sensing noise may be disposed in the peripheral region ER.

The first sensing patterns 225R may extend between the sensing region SR and the first contact region CR1 or between the sensing region SR and the third contact region CR3, for example. The first sensing patterns 225R may be connected to the controller chip 310 through the first-first sensing vias 231R, the second-first sensing vias 233R, and the third-first sensing vias 235R disposed in the first and third contact regions CR1 and CR3. In the first contact region CR1, the first-first sensing vias 231R, the second-first sensing vias 233R, and the third-first sensing vias 235R may be respectively arranged in the first direction (X-direction). In addition, in the third contact region CR3, the first-first sensing vias 231R, the second-first sensing vias 233R, and the third-first sensing vias 235R may respectively be arranged in the first direction (X-direction). A portion of the first sensing patterns 225R may be connected to the first-first sensing vias 231R, the second-first sensing vias 233R, and the third-first sensing vias 235R disposed in the first contact region CR1. In addition, the other portion of the first sensing patterns 225R may be connected to the first-first sensing vias 231R, the second-first sensing vias 233R, and the third-first sensing vias 235R disposed in the third contact region CR3. The adjacent first sensing patterns 225R may be electrically isolated from each other.

The second sensing patterns 227T may extend in the sensing region SR and the second contact region CR2. The second sensing patterns 227T may be connected to the controller chip 310 through the first-second sensing vias 231T, the second-second sensing vias 233T, the third-second sensing vias 235T, and the fourth-second sensing vias 237T disposed in the second contact region CR2. The first-second sensing vias 231T, the second-second sensing vias 233T, the third-second sensing vias 235T, and the fourth-second sensing vias 237T may respectively be disposed in a zigzag manner in the second direction (Y-direction).

The first sensing patterns 225R may have a first width W1 that is a width in the first direction (X-direction), and the second sensing patterns 227T have a second width W2 that is a width in the second direction (Y-direction). In some example embodiments, the first width W1 may be wider than the second width W2. For example, the first width W1 may have a range of about 2 times to about 4 times the second width W2. Specifically, the first width W1 may have a range of about 40 µm to about 70 µm, and the second width W2 may have a range of about 5 µm to about 25 µm.

A portion in which the first sensing patterns 225R and the second sensing patterns 227T overlap in a third direction (Z-direction) may be included in pixels PX. A first pitch PIX in the first direction (X-direction) between central portions PXC of the pixels PX may be substantially the same as a second pitch PIY in the second direction (Y-direction) between the central portions PXC of the pixels PX, but the present disclosure is not limited thereto. For example, the first pitch PIX and the second pitch PIY may have a range of about 50 µm to about 90 µm, respectively.

The pixels PX may have a combined capacitance value of area capacitance AC caused by the first sensing patterns 225R and the second sensing patterns 227T overlapping each other, and fringing capacitance caused by the first sensing patterns 225R and the second sensing patterns 227T.

When the fingerprint of the user comes into contact with the upper surface 200U of the second substrate 200, a capacitance value corresponding to each of the pixels PX may be changed by capacitance induced between the second sensing patterns 227T and the fingerprint of the user. A change in the capacitance value may be determined depending on a shape of the fingerprint of the user, such that the controller chip 310 may identify the fingerprint of the user from a change in capacitance values of the pixels PX.

The fourth ground pattern 227G may surround the sensing region SR in which the second sensing patterns 227T are disposed in a planar manner. The fourth ground pattern 227G may be positioned on a vertical level the same as that of the second sensing patterns 227T, and may surround the second sensing patterns 227T in planar manner. For example, the fourth ground pattern 227G may extend continuously along an edge of the sensing region SR on the upper surface of the upper insulating layer 215 to surround the second sensing patterns 227T in a planar manner. The fourth ground pattern 227G may be disposed around the sensing region SR to reduce sensing noise while the fingerprint of the user is in contact with the sensing region SR.

The base layer 211 may include an insulating material. The base layer 211 may include a resin and a glass fiber. The resin included in the base layer 211 may be at least one selected from among a phenol resin, an epoxy resin, and a polyimide. In some example embodiments, the base layer 211 may include at least one material selected from among flame retardant 4 (FR4), tetrafunctional epoxy, polyphenylene ether, epoxy/polyphenylene oxide, thermount, bismaleimide triazine (BT), cyanate ester, polyimide, a prepreg, an Ajinomoto build-up film (ABF), and a liquid crystal polymer. In other example embodiments, the base layer 211 may include silicon oxide, silicon nitride, silicon oxynitride, or combinations thereof. As a reinforcing material, the glass fiber included in the base layer 211 may be convergence of a glass filament obtained by melt-spinning a glass material at high temperature. The glass filament may be an ore processing product containing silica as a main component.

Hereinafter, for ease of description and understanding, components of the second substrate 200 will be described in an order in which a distance from the base layer 211 increases.

The second conductive layers 223G, 223R, and 223T may include the second ground pattern 223G to which a reference potential is applied, the second-first sensing pads 223R, and the second-second sensing pads 223T. The second ground pattern 223G may be disposed in the sensing region SR, the wiring region YR, and the peripheral region ER. A portion of the second ground pattern 223G may overlap the first sensing patterns 225R and the second sensing patterns 227T in the third direction (Z-direction). A portion of the second ground pattern 223G may be interposed between the second sensing patterns 227T and the controller chip 310. Accordingly, the second ground pattern 223G may block external sensing noise to the controller chip 310. The second-first sensing pads 223R may be disposed in the first and third contact regions CR1 and CR3, and the second-second sensing pads 223T may be disposed in the second contact region CR2. The second-first sensing pads 223R may provide a path for electrical connection between the first sensing patterns 225R and the controller chip 310, and the second-second sensing pads 223T may provide a path for electrical connection between the second sensing patterns 227T and the controller chip 310.

The lower insulating layer 213 may be disposed on the lower surface of the base layer 211 to cover the second conductive layers 223G, 223R, and 223T. The lower insulating layer 213 may electrically isolate the second-first sensing pads 223R, the second-second sensing pads 223T, and the second ground pattern 223G from each other.

The third conductive layers 225G, 225R, and 225T may include a third ground pattern 225G to which a reference potential is applied, the first sensing patterns 225R for recognizing the fingerprint of the user, and the third-second sensing pads 225T. The first sensing patterns 225R may be disposed in the sensing region SR, the third ground pattern 225G may be disposed in the wiring region YR and the peripheral region ER, and the third-second sensing pads 225T may be disposed in the second contact region CR2. The third-second sensing pads 225T may provide a path for electrical connection between the second sensing patterns 227T and the controller chip 310.

The upper insulating layer 215 may be disposed on the upper surface of the base layer 211 to cover the third conductive layers 225G, 225R, and 225T. The upper insulating layer 215 may electrically isolate the first sensing patterns 225R, the third-second sensing pads 225T, and the third ground pattern 223G from each other.

The lower insulating layer 213 and the upper insulating layer 215 may include different materials. For example, the upper insulating layer 215 may include a material having a dielectric constant suitable for fingerprint recognition of the fingerprint sensor package 10. However, example embodiments of the present disclosure are not limited thereto, and the lower insulating layer 213 and the upper insulating layer 215 may include the same material.

The lower insulating layer 213 and the upper insulating layer 215 may include at least one selected from among a phenol resin, an epoxy resin, and a polyimide. In some example embodiments, the lower insulating layer 213 and the upper insulating layer 215 may include at least one selected from among a prepreg, FR4, quadrilateral epoxy, polyphenylene ether, epoxy/polyphenylene oxide, thermount, BT, cyanate ester, polyimide, and a liquid crystal polymer.

The fourth conductive layers 227G and 227T may be disposed on the upper surface of the upper insulating layer 215. The fourth conductive layers 227G and 227T may include the fourth ground pattern 227G for removing sensing noise and the second sensing patterns 227T for recognizing the fingerprint of the user. The second sensing patterns 227T may be disposed in the sensing region SR, and the fourth ground pattern 227G may be disposed in the peripheral region ER.

The second sensing patterns 227T may be spaced apart from the first sensing patterns 225R in the third direction (Z-direction) with the insulating layer 215 interposed therebetween. That is, the second sensing patterns 227T may be electrically insulated from the first sensing patterns 225R by the upper insulating layer 215. Accordingly, the first sensing patterns 225R may be included in a first electrode of a capacitor, the upper insulating layer 215 may be included in a dielectric layer of the capacitor, and the second sensing patterns 227T may be included in a second electrode of the capacitor. That is, capacitors included in a fingerprint sensor may be formed in the second substrate 200.

The upper protective layer 219 may be disposed on the upper surface of the upper insulating layer 215 to cover the fourth conductive layers 227G and 227T.

The first conductive layers 221B, 221G, 221R, 221T, and 221P may be disposed on the lower surface of the lower insulating layer 213. The first conductive layers 221B, 221G, 221R, 221T, and 221P may include the second bonding pads 221B, the first-first sensing pads 221R, the first-second sensing pads 221T, the first ground pattern 221G to which a reference potential is applied, and the power pattern 221P.

The second bonding pads 221B may be connected to the conductive wires 340, and may be electrically connected to the first bonding pads 120 of the first substrate 100 through the conductive wires 340. The second bonding pads 221B may include a power pad to which power (for example, a power potential) provided from an external device is applied, a ground pad to which a reference potential is applied, and an output pad for outputting a fingerprint recognition result of the fingerprint sensor package 10 to the outside (for example, the display 12 of the smart card 1 of FIG. 1). The controller chip 310 may receive a power potential through some of the second bonding pads 221B and the power pattern 221P, and may receive a reference potential through some of the second bonding pads 221B and the first ground pattern 221G. In addition, the controller chip 310 may receive a signal recognized by the first and second sensing patterns 225R and 227T through the first-first sensing pads 221R and the first-second sensing pads 221T.

The first-first sensing pads 221R may extend from the first and third contact regions CR1 and CR3 to a portion overlapping the controller chip 310 in the third direction (Z-direction). The first-second sensing pads 221T may extend from the second contact region CR2 to the portion overlapping the controller chip 310 in the third direction (Z-direction). The first-first sensing pads 221R may provide a path for electrical connection between the first sensing patterns 225R and the controller chip 310, and the first-second sensing pads 221T may provide a path for electrical connection between the second sensing patterns 227T and the controller chip 310.

The lower protective layer 217 may be disposed on the lower surface of the lower insulating layer 213 to cover at least a portion of the first conductive layers 221B, 221G, 221R, 221T, and 221P. In some example embodiments, the lower protective layer 217 may be formed to cover a portion of the lower surface of the lower insulating layer 213. In other example embodiments, the lower protective layer 217 may be formed to entirely cover the lower surface of the lower insulating layer 213.

The lower protective layer 217 and the upper protective layer 219 may be insulating coating layers. In some example embodiments, the lower protective layer 217 and the upper protective layer 219 may be formed of a solder resist. In other example embodiments, the lower protective layer 217 and the upper protective layer 219 may include a polymer material having excellent heat resistance, insulation, and hardness. For example, the lower protective layer 217 and the upper protective layer 219 may be formed of polyimide, polyamide, polyacetal, polycarbonate, or the like, respectively. In some example embodiments, the upper protective layer 219 in contact with the fingerprint of the user may be formed of a material having a hardness higher than that of the lower protective layer 217 to perform protection from external influences such as contamination, impact, scratches, and the like. For example, the upper protective layer 219 and the lower protective layer 217 may be formed of solder resist, and the upper protective layer 219 may be formed of a high hardness solder resist having a hardness of 4H or higher. In some example embodiments, the upper protective layer 140 may include a material (for example, a high-K material) having a dielectric constant suitable for fingerprint recognition.

The controller chip 310 and the passive device 320 may be disposed on a lower surface of the second substrate 200. The controller chip 310 may be mounted on the lower surface of the second substrate 200 in a flip-chip manner. Connection bumps 315 for electrically and physically connecting the controller chip 310 and the second substrate 200 to each other may be disposed between the controller chip 310 and the second substrate 200. The connection bumps 315 may be disposed between some patterns of the first conductive layers 221B, 221G, 221R, 221T, and 221P and chip pads 311 of the controller chip 310.

In some example embodiments, the controller chip 310 may be entirely or partially disposed in the sensing region SR. In other example embodiments, the controller chip 310 may be entirely disposed outside the sensing region SR. The controller chip 310 may include any component required to perform an operation for recognizing the fingerprint of the user from a change in capacitance values of the pixels PX, such as a memory chip and/or a processor chip. In addition, the passive device 320 may include, for example, a multi-layer ceramic capacitor (MLCC), but the present disclosure is not limited thereto.

The molding layer 350 may be disposed on the first substrate 100 and the second substrate 200 to cover the controller chip 310 and the passive device 320. The molding layer 350 may fill a space between the sidewall of the through-hole 110H and the sidewall of the second substrate 200. The molding layer 350 may serve to protect the second substrate 200, the controller chip 310, and the passive device 320 from external influences such as contamination, impact, and the like. An upper surface 350U of the molding layer 350 may be formed to be substantially coplanar with the upper surface 100U of the first substrate 100 and the upper surface 200U of the second substrate 200. However, example embodiments of the present disclosure are not limited thereto, and the upper surface 350U of the molding layer 350 may be formed to be concave by a meniscus generated during a manufacturing process in some example embodiments, for example. The molding layer 350 may have a central portion thicker than an edge thereof. The lower surface 350B of the molding layer 350 may be formed to be convex. For example, a thickness T1 of the central portion of the molding layer 350 may be greater than a thickness T2 of the molding layer 350 at an more outward portion. For example, a thickness T1 of the molding layer 350 in the third direction (Z-direction) from an upper surface 350U of the molding layer 350 to a central portion of the lower surface of the molding layer 350 is greater than a thickness T2 of the molding layer in the third direction (Z-direction) from the upper surface 350U of the molding layer 350 to a portion of the lower surface of the molding layer 350 that is aligned with a sidewall of the second substrate 200, as illustrated in FIG. 2D, for example.

In addition, the molding layer 350 may cover the first bonding pads 120 disposed on the second surface 113 of the core insulating layer 110, and may, in an example embodiment, not cover the external connection pads 130 so that the external connection pads 130 are exposed to the outside. The molding layer 350 may extend on the second surface 113 of the core insulating layer 110 along a boundary between a region in which the first bonding pads 120 are disposed and a region in which the external connection pads 130 are disposed. The molding layer 350 may extend from a side surface of the second substrate 200 in a lateral direction to cover the first bonding pads 120, and may be spaced apart from the external connection pads 130. The molding layer 350 may be formed to cover a second distance D2 from the through-hole 110H of the first substrate 100. For example, the second distance D2 may have a range from about 0.1 mm to about 3.0 mm.

The molding layer 350 may be formed of an epoxy molding compound. Alternatively, the molding layer 350 may be formed of an epoxy-based material, a thermosetting material, a thermoplastic material, a UV-treated material, or the like.

In the fingerprint sensor package 10 according to an example embodiment, the sensing region SR corresponding to a fingerprint recognition sensor may be included in the second substrate 200 itself, such that an overall thickness of the fingerprint sensor package 10 may be reduced, and the fingerprint sensor package 10 may be used to manufacture a smart card having the same level of thickness as those of a conventional credit card and a debit card. In addition, in the fingerprint sensor package 10 according to an example embodiment, the sensing region SR of the second substrate 200 may be exposed to the outside to be in direct contact with the fingerprint of the user, thereby improving reliability and sensitivity of obtaining fingerprint information.

Figure 3:
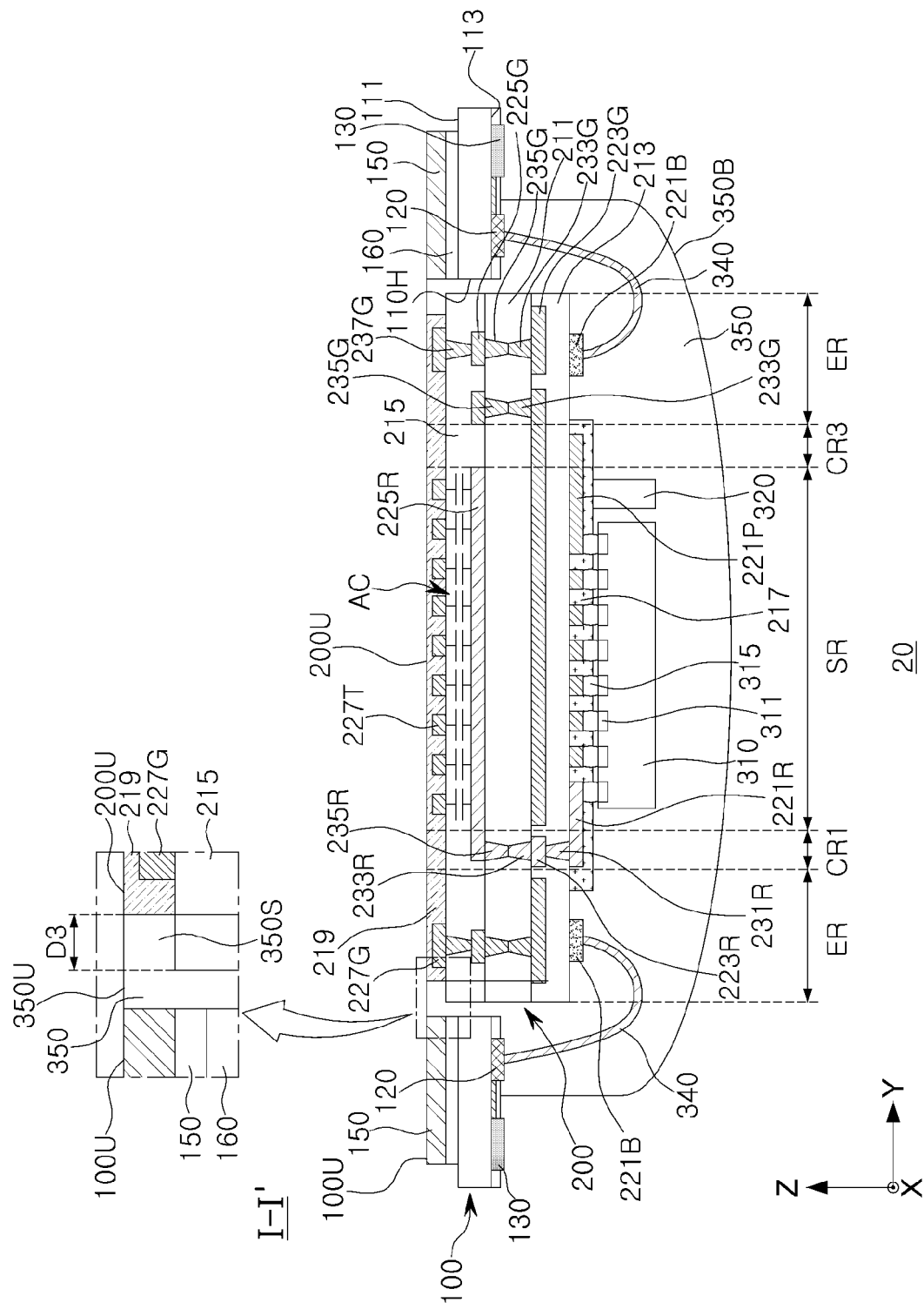
FIGS. 3 and 4 are plan views illustrating a fingerprint sensor package according to an example embodiment of the present disclosure.

FIG. 3 is a cross-sectional view illustrating a fingerprint sensor package 20 according to example embodiments of the present disclosure.

The fingerprint sensor package 20 illustrated in FIG. 3 may be substantially the same as or similar to the fingerprint sensor package 10 described with reference to FIGS. 2A to 2E, except that a portion of the upper protective layer 219 of the second substrate 200 is removed. Hereinafter, the fingerprint sensor package 20 of FIG. 3 will be described mainly based on a difference from the fingerprint sensor package 10 described with reference to FIGS. 2A to 2E.

Referring to FIG. 3, the upper protective layer 219 may be formed to cover a partial region of the upper surface 200U of the second substrate 200, and may be spaced apart from edges of the upper surface 200U of the second substrate 200. For example, the upper protective layer 219 may be spaced apart from a side surface of the second substrate 200 by a third distance D3. An upper surface of the upper protective layer 219 may be substantially coplanar with the upper surface 100U of the first substrate 100. In addition, the upper surface of the upper protective layer 219 may refer to a surface the same as the upper surface 200U of the second substrate 200, and thus the upper surface 200U of the second substrate 200 may be substantially coplanar with the upper surface 100U of the first substrate 100. In addition, the upper surface of the upper protective layer 219 may be substantially coplanar with the upper surface 350U of the molding layer 350.

The molding layer 350 may be formed to fill the through-hole 110H and the side surface of the second substrate 200 and to extend on the upper surface 200U of the second substrate 200. For example, the molding layer 350 may cover a region of the upper surface 200U of the second substrate 200 from which the upper protective layer 219 is removed to form a step portion 350S. The step portion 350S of the molding layer 350 may cover the upper surface 200U of the second substrate 200, such that the molding layer 350 and the second substrate 200 are firmly fixed to each other.

Figure 4:
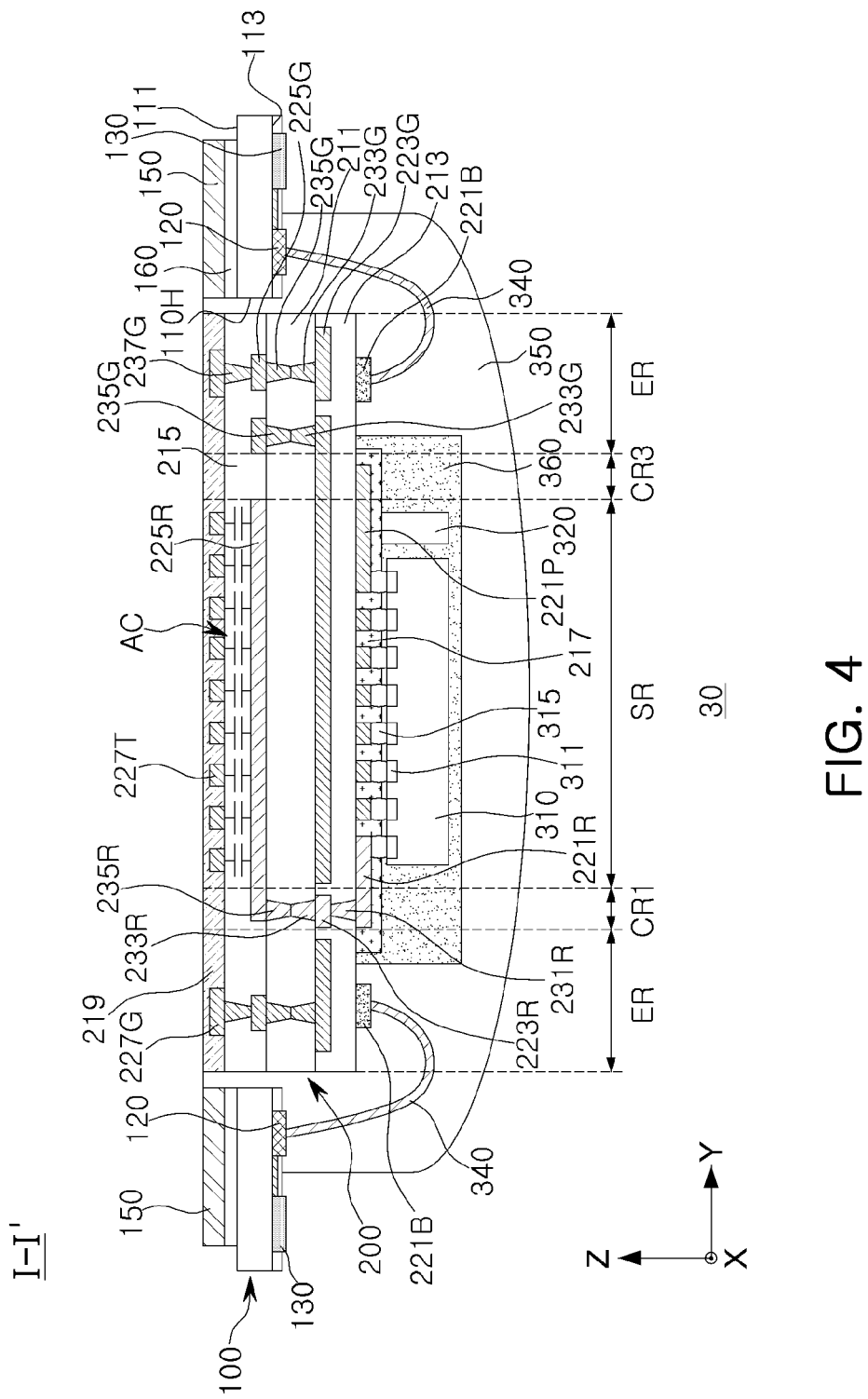
Figure 5A:
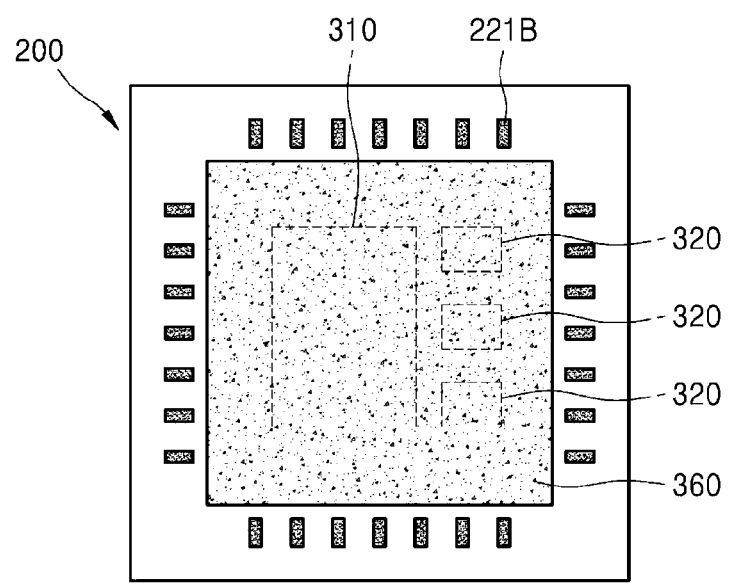
FIGS. 5A and 5B are bottom views illustrating an inner molding layer of the fingerprint sensor package illustrated in FIG. 4.
Figure 5B:
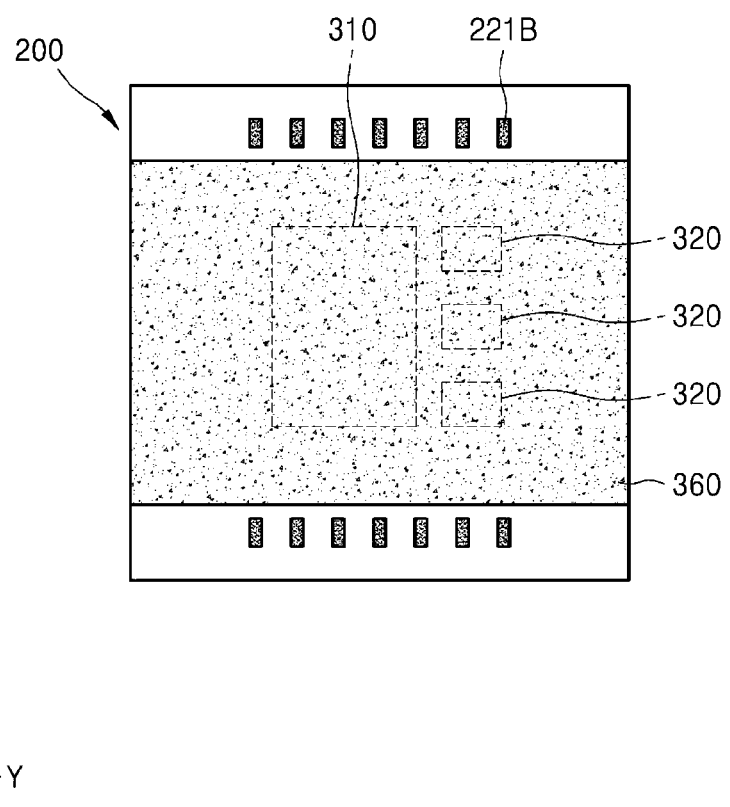

FIG. 4 is a cross-sectional view illustrating a fingerprint sensor package 30 according to example embodiments of the present disclosure. FIGS. 5A and 5B are bottom views illustrating an inner molding layer 360 of the fingerprint sensor package 20 illustrated in FIG. 4, respectively.

The fingerprint sensor package 20 illustrated in FIG. 4 may be substantially the same as or similar to the fingerprint sensor package 10 described with reference to FIGS. 2A to 2E, except that the inner molding layer 360 is further included. Hereinafter, the fingerprint sensor package 20 of FIG. 4 will be described mainly based on a difference from the fingerprint sensor package 10 described with reference to FIGS. 2A to 2E.

Referring to FIG. 4, the inner molding layer 360 may be disposed on a lower surface of the second substrate 200 to cover the controller chip 310 and the passive device 320. In a process of manufacturing the fingerprint sensor package 20, the molding layer 350 may be formed after the inner molding layer 360 is formed. The inner molding layer 360 may be formed on the lower surface of the second substrate 200 to cover the controller chip 310 and the passive device 320, and the molding layer 350 may be formed to cover the inner molding layer 360. The inner molding layer 360 may be between the controller chip 310 and the molding layer 350, and between the passive device 320 and the molding layer 350. The inner molding layer 360 may be formed of an epoxy molding compound. Alternatively, the inner molding layer 360 may be formed of an epoxy-based material, a thermosetting material, a thermoplastic material, a UV-treated material, or the like. In some example embodiments, the molding layer 350 may be formed of a transparent material or a translucent material. As the molding layer 350 is formed of a transparent material or a translucent material, a shape of the inner molding layer 360 may be confirmed from the outside.

In some example embodiments, as illustrated in FIG. 5A, the inner molding layer 360 may be formed to cover a partial region of the lower surface of the second substrate 200, and may be spaced apart from edges of the lower surface of the second substrate 200. The inner molding layer 360 may, in an example embodiment, not cover a region in which the second bonding pads 221B are disposed.

In some example embodiments, as illustrated in FIG. 5B, when the lower surface of the second substrate 200 has a first edge and a second edge opposing each other, the inner molding layer 360 may extend between the first edge and the second edge of the lower surface of the second substrate 200. For example, the inner molding layer 360 may extend in a second direction (Y-direction) from the first edge to the second edge of the lower surface of the second substrate 200.

Figure 6A:
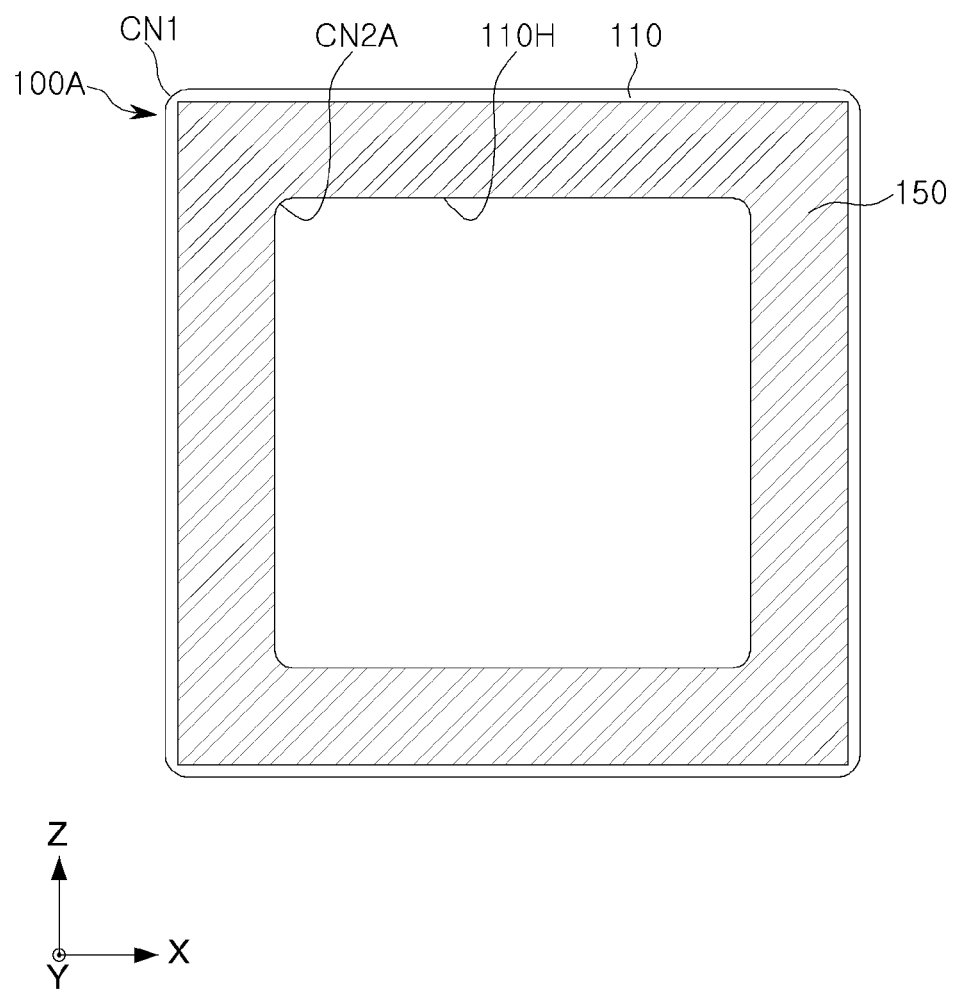
FIGS. 6A and 6B are plan views illustrating a modification of a first substrate employable in a fingerprint sensor package according to an example embodiment of the present disclosure.
Figure 6B:
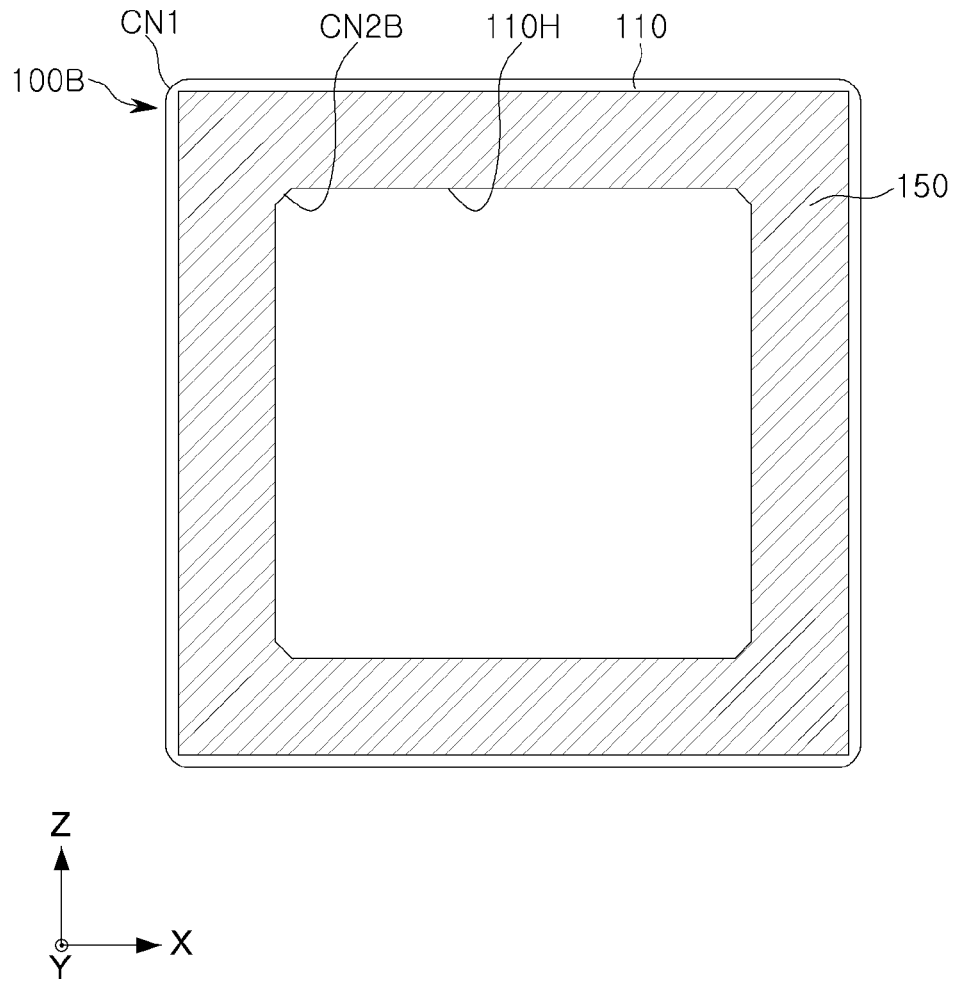

FIGS. 6A and 6B are plan views illustrating various modifications of a first substrate employable in a fingerprint sensor package according to example embodiments of the present disclosure, respectively.

Referring to FIG. 6A, all inner corners CN2A formed in the through-hole 110H of the first substrate 100A may be formed to have a rounded shape. In some example embodiments, each of the inner corners CN2 of the first substrate 100A may have a radius of curvature substantially the same as that of each of the outer corners CN1. Referring to FIG. 6B, all inner corners CN2B formed in the through-hole 110H of the first substrate 100B may be formed to have a tapered shape.

Figure 7:
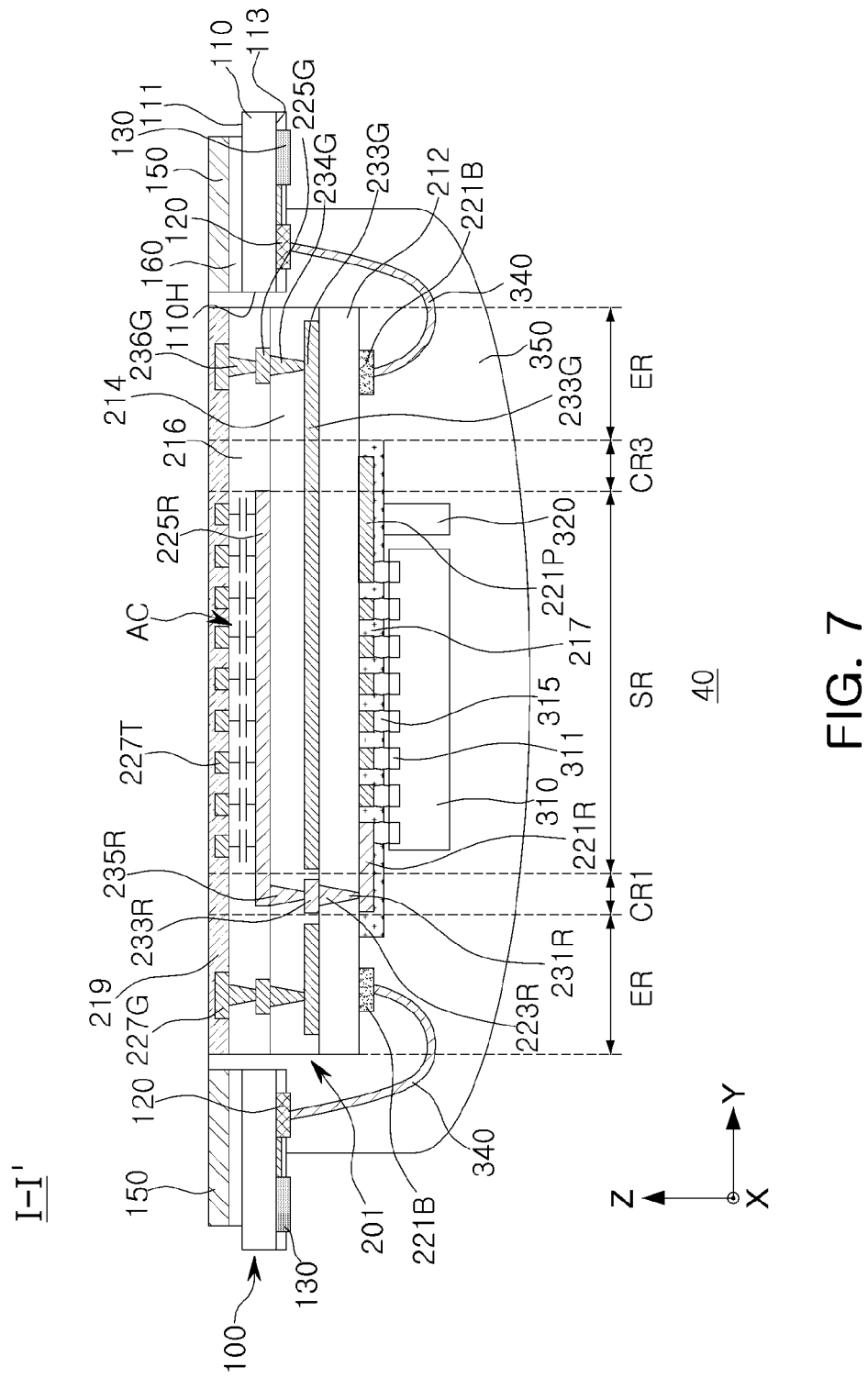
FIGS. 7 and 8 are cross-sectional views illustrating a fingerprint sensor package according to an example embodiment of the present disclosure.

FIG. 7 is a cross-sectional view illustrating a fingerprint sensor package 40 according to example embodiments of the present disclosure.

The fingerprint sensor package 40 illustrated in FIG. 7 may be substantially the same as or similar to the fingerprint sensor package 10 described with reference to FIGS. 2A to 2E, except for a second substrate 201. Hereinafter, the fingerprint sensor package 40 of FIG. 7 will be described mainly based on a difference from the fingerprint sensor package 10 described with reference to FIGS. 2A to 2E.

Referring to FIG. 7, the fingerprint sensor package 30 may include the first substrate 100, the second substrate 201, the controller chip 310, the passive device 320, and the molding layer 350.

The second substrate 201 may lack a base layer. The second substrate 201, an insulating material, may include first to third insulating layers 212, 214, and 216. The second substrate 201 may include first conductive vias 232R in the first insulating layer 212, second conductive vias 234G and 234R in the second insulating layer 214, and third conductive vias 236G in the third insulating layer 216. The first conductive vias 232R, the second conductive vias 234G and 234R, and the third conductive vias 236G may be tapered toward a lower surface of the second substrate 201 in contact with the controller chip 310.

The first insulating layer 212 may be disposed on the lower protective layer 217. The first conductive vias 232R may be pass through the first insulating layer 212 to be in contact with first conductive layers 221B, 221R, and 221P on a lower surface of the first insulating layer 212 and second conductive layers 223G and 223R on an upper surface of the first insulating layer 212.

The second insulating layer 214 may be disposed on the first insulating layer 212. The second conductive layers 223G and 223R may be covered by the second insulating layer 214. The second conductive vias 234G and 234R may pass through at least a portion of the second insulating layer 214 to be in contact with the second conductive layers 223G and 223R on the upper surface of the first insulating layer 212, and third conductive layers 225G and 225R on an upper surface of the second insulating layer 214.

The third insulating layer 216 may be disposed on the second insulating layer 214. The third conductive layers 225G and 225R may be covered by the third insulating layer 216. The third conductive vias 236G and 236T may pass through at least a portion of the third insulating layer 216 to be in contact with the third conductive layers 225G and 225R on the upper surface of the second insulating layer 214 and the fourth conductive layers 227G and 227T on an upper surface of the third insulating layer 216.

Figure 8:
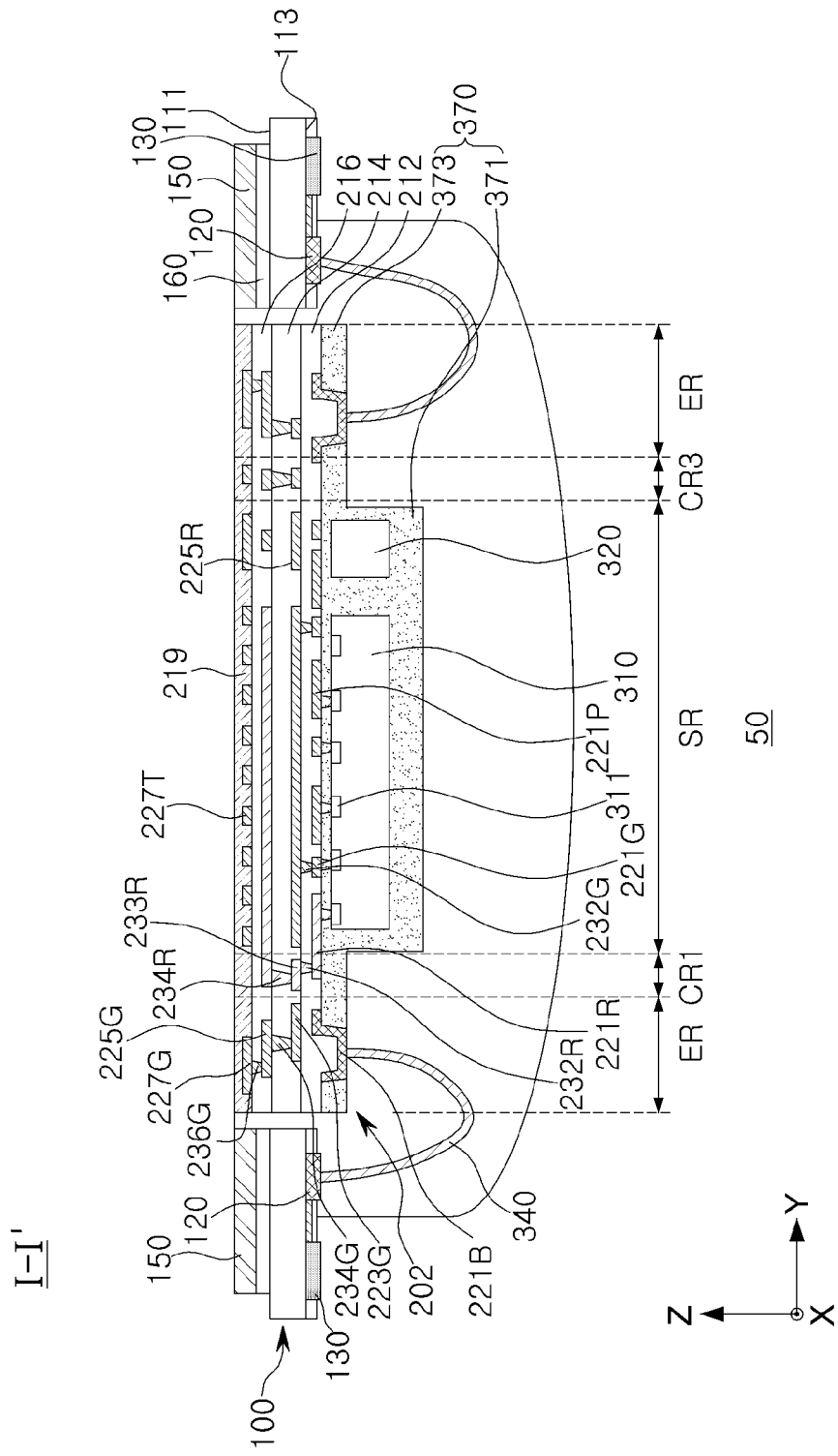

FIG. 8 is a cross-sectional view illustrating a fingerprint sensor package 50 according to example embodiments of the present disclosure.

The fingerprint sensor package 50 illustrated in FIG. 8 may be substantially the same as or similar to the fingerprint sensor package 10 described with reference to FIGS. 2A to 2E, except for a second substrate 202. Hereinafter, the fingerprint sensor package 50 of FIG. 8 will be described mainly based on a difference from the fingerprint sensor package 10 described with reference to FIGS. 2A to 2E.

Referring to FIG. 8, the fingerprint sensor package 40 may include the first substrate 100, the second substrate 202, the controller chip 310, the passive device 320, a conductive wire 340, the molding layer 350, and an inner molding layer 370. The fingerprint sensor package 40 may have a fan-out wafer-level package (FO-WLP) structure.

The second substrate 202 may lack a base layer. The second substrate 202 may include first to third insulating layers 212, 214, and 216 sequentially stacked and a wiring structure. The wiring structure may include first conductive layers 221B, 221G, 221P, and 221R, second conductive layers 223G and 223R, third conductive layers 225G and 225R, and fourth conductive layers 227G and 227T. In addition, the wiring structure may include first conductive vias 232G and 232R, second conductive vias 234G and 234R, and third conductive vias 236G being tapered toward the controller chip 310. In some example embodiments, the wiring structure may be formed by a dual damascene process.

The inner molding layer 370 may include a step formed by partially removing a flat mold material layer. The inner molding layer 370 may include a first molding portion 371 protecting the controller chip 310 and the passive device 320, and a second molding portion 373 surrounding the first molding portion 371. The second molding portion 373 may extend along a lower surface of the first insulating layer 212.

A second bonding pad 221B may be exposed through the second molding portion 373. For example, the second bonding pad 221B may be disposed in an opening formed in the second molding portion 373. A first segment of the second bonding pad 221B may extend on an upper surface of the second molding portion 373 in contact with the first insulating layer 212, a second segment of the second bonding pad 221B may extend along an inner wall of the second molding portion 373 defining the opening formed in the second molding portion 373, and a third segment of the second bonding pad 221B may extend on a level the same as that of a bottom surface of the second molding portion 373. The conductive wire 340 may be connected to the third segment of the second bonding pad 221B.

Figure 9A:
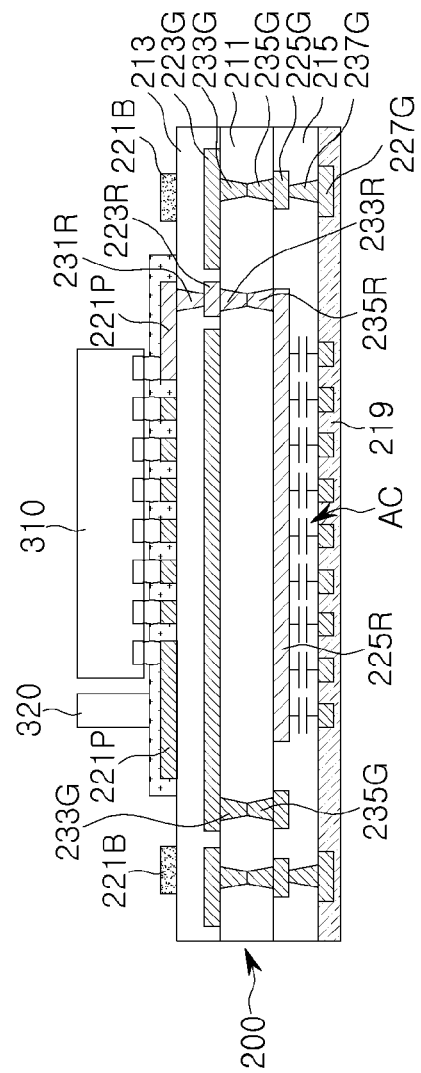
FIGS. 9A to 9H are diagrams illustrating a method of manufacturing a smart card in a process order according to an example embodiment of the disclosure.
Figure 9B:
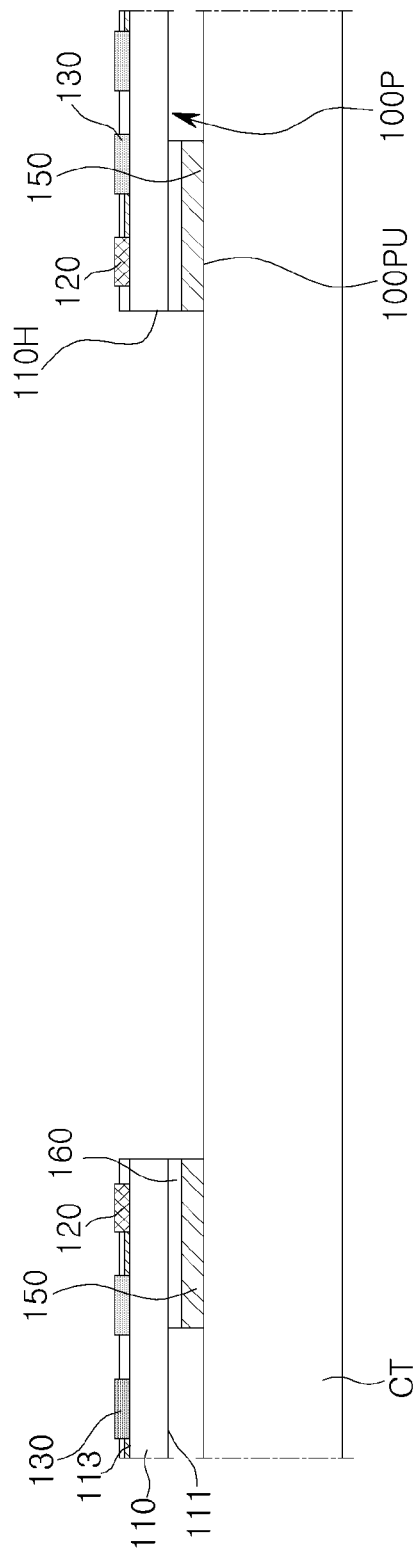
Figure 9C:
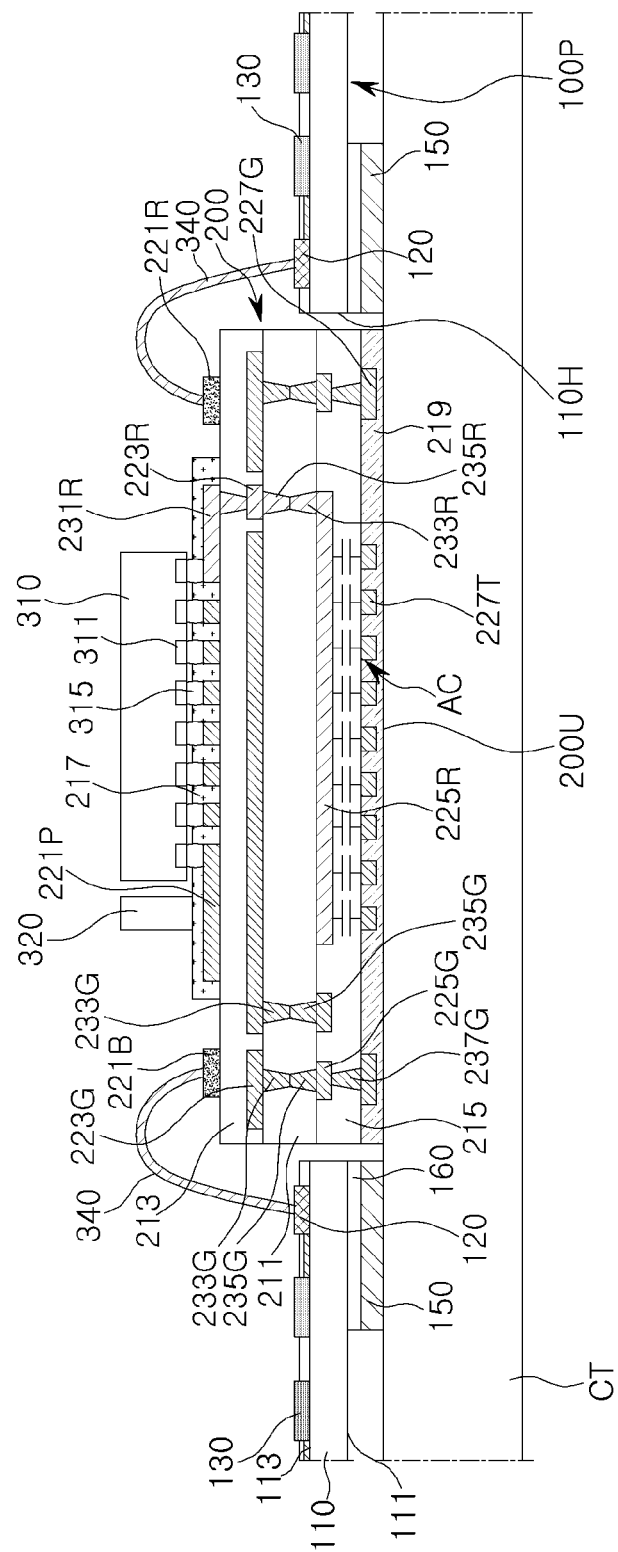
Figure 9D:
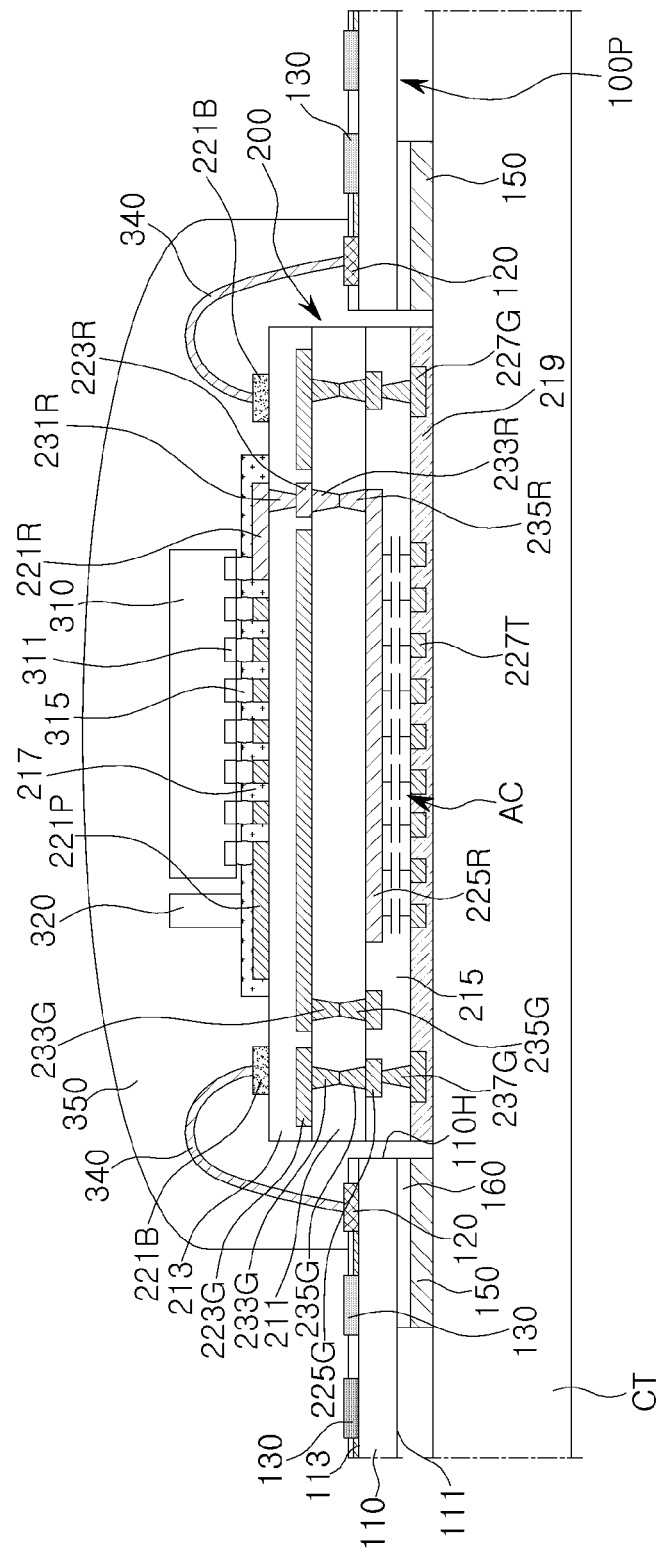
Figure 9E:
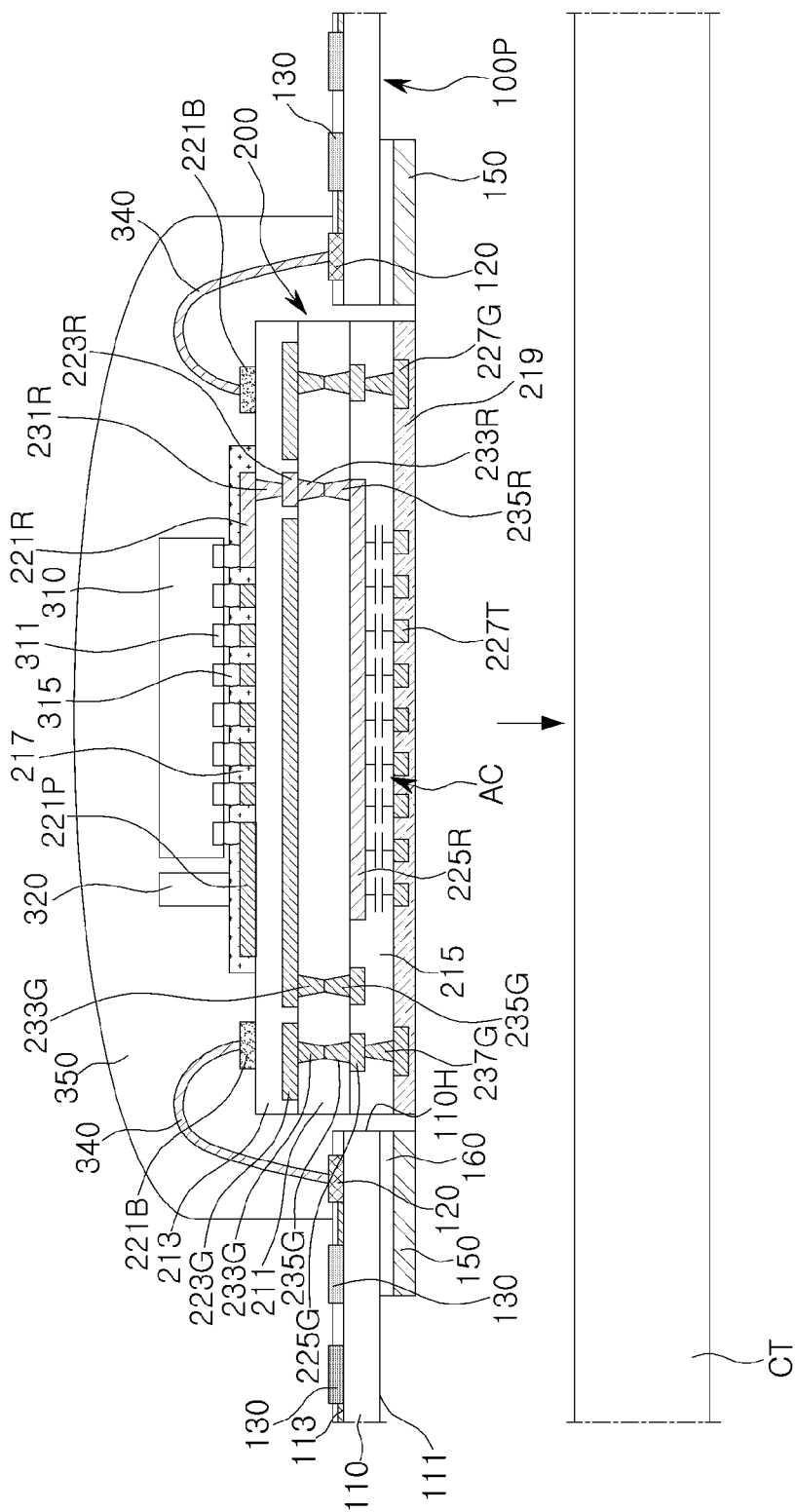
Figure 9F:
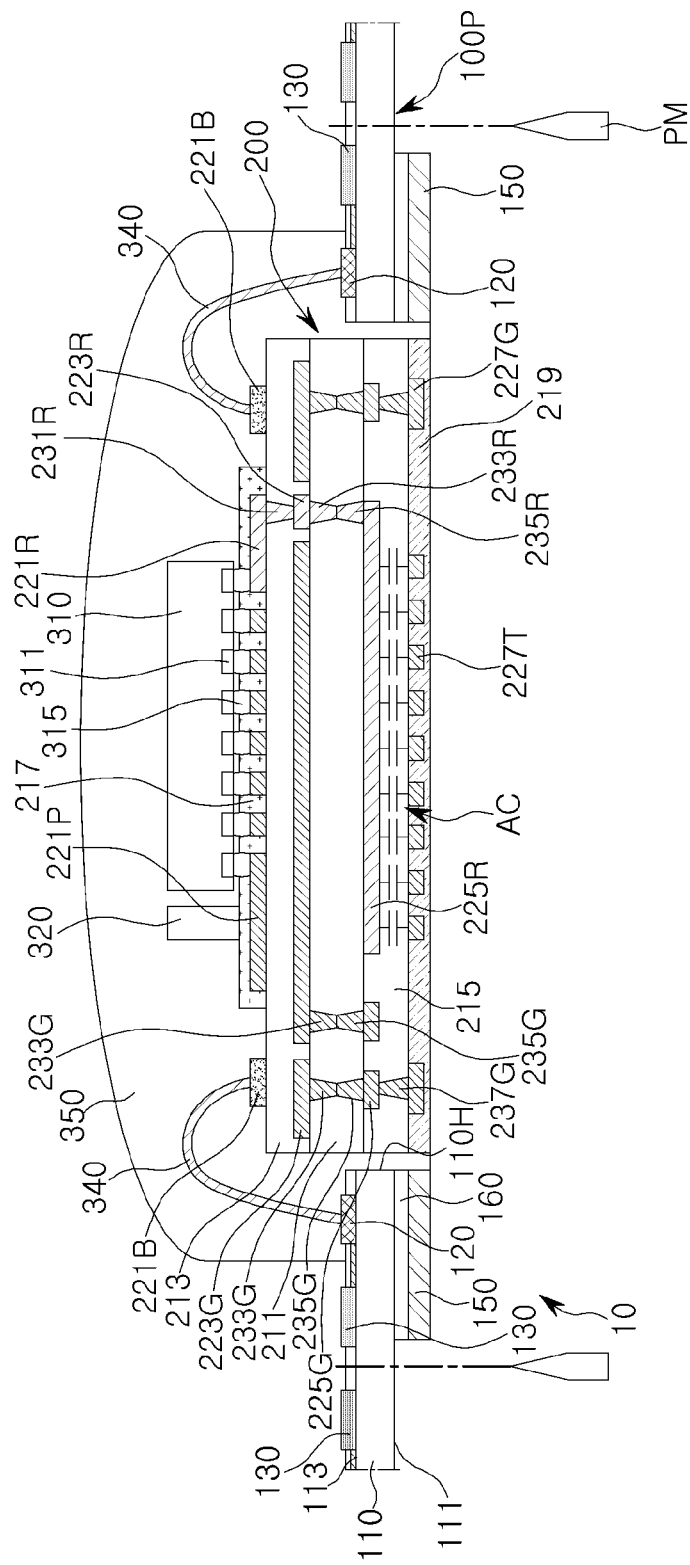
Figure 9G:
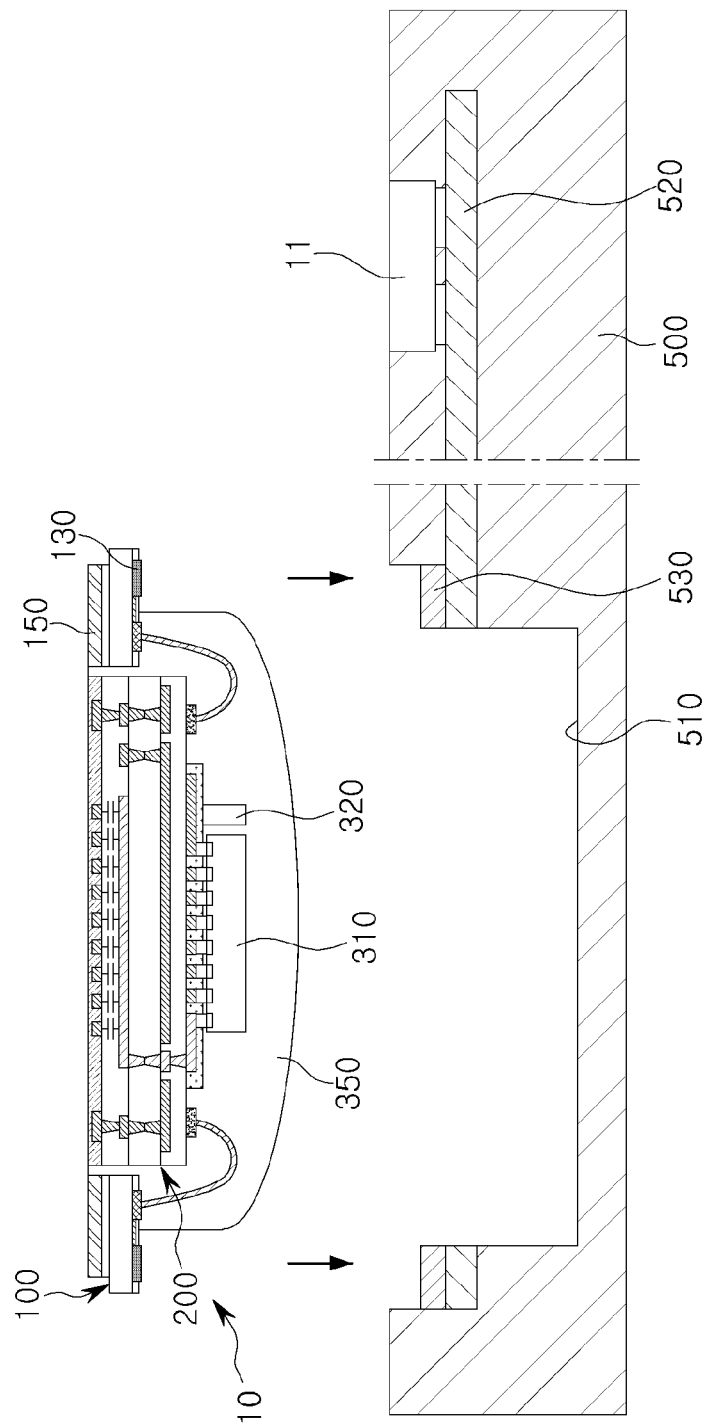
Figure 9H:
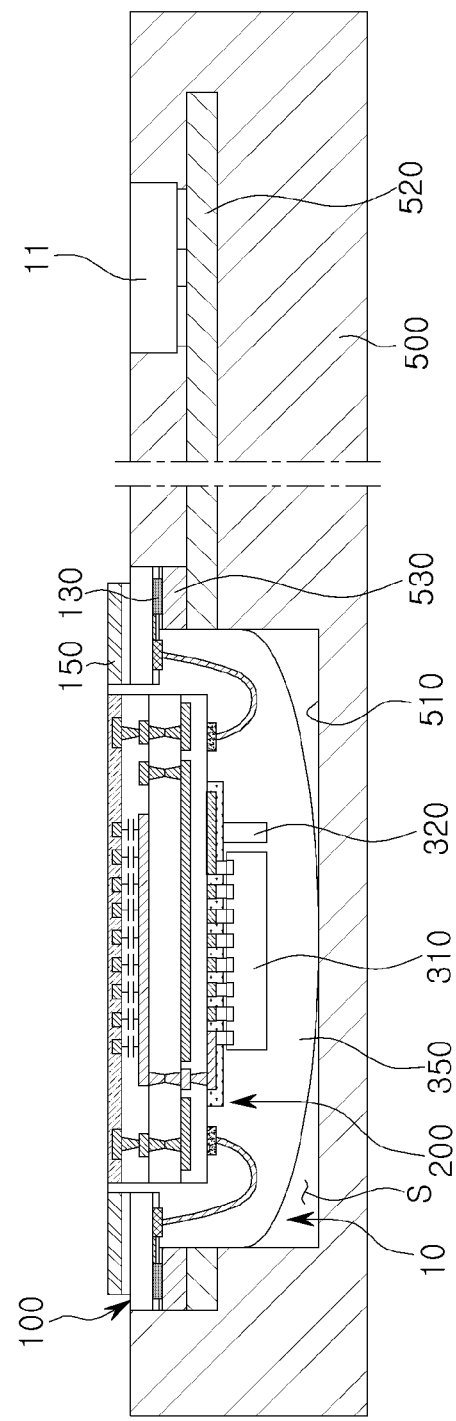

FIGS. 9A to 9H are diagrams illustrating a method of manufacturing a smart card in order according to example embodiments of the present disclosure. Specifically, it may be understood that FIGS. 9A to 9F illustrate a process for manufacturing a fingerprint sensor package mounted on a smart card, and FIGS. 9G and 9H illustrate a process for manufacturing a smart card by mounting a fingerprint sensor package on a card body.

Referring to FIG. 9A, the second substrate 200 may be prepared, and the controller chip 310 and the passive device 320 may be mounted on the second substrate 200. The controller chip 310 may be mounted on the second substrate 200 in a flip-chip manner.

Referring to FIG. 9B, a first panel substrate 100P on which the second substrate 200 is to be mounted may be prepared. Most components and materials included in the first panel substrate 100P may be substantially the same as or similar to those of the first substrate 100 of the fingerprint sensor package 10 described with reference to FIGS. 2A to 2E. However, the first panel substrate 100P may have a planar area larger than that of the first substrate 100, such that a plurality of second substrates 200 may be mounted thereon. The first panel substrate 100P may be mounted on a winding reel facility, and reeling and releasing of the first panel substrate 100P may be controlled by the winding reel facility. The second substrate 200 may be provided in a state in which a through-hole 110H is formed and a carrier tape CT is attached to a rear surface thereof. The carrier tape CT may be used to temporarily fix the second substrate 200 in a subsequent process.

Referring to FIG. 9C, the second substrate 200 may be disposed in the through-hole 110H of the first panel substrate 100P. The second substrate 200 may be attached to the carrier tape CT exposed on a bottom surface of the through-hole 110H of the first panel substrate 100P, and thus may be fixed in the through-hole 110H. After the second substrate 200 is disposed in the through-hole 110H of the first panel substrate 100P, a conductive wire 340 for electrically connecting the first panel substrate 100P and the second substrate 200 to each other may be formed. The conductive wire 340 may extend between the first bonding pad 120 of the first panel substrate 100P and the second bonding pad 221B of the second substrate 200. The conductive wire 340 may be formed through a wire bonding process.

Referring to FIG. 9D, the molding layer 350 may be formed on the second surface 113 of the core insulating layer 110. The molding layer 350 may cover the second substrate 200, the controller chip 310, the passive device 320, and the conductive wire 340. The molding layer 350 may be introduced into the through-hole 110H of the first panel substrate 100P to fill a space between a side surface of the through-hole 110H and a side surface of the second substrate 200. In addition, the molding layer 350 may cover the first bonding pad 120 of the first panel substrate 100P, and may, in an example embodiment, not cover the external connection pads 130. That is, the molding layer 350 may extend along the second surface 113 of the core insulating layer 110 in a lateral direction from the side surface of the second substrate 200 to a boundary between the first bonding pad 120 and an external connection terminal.

Referring to FIG. 9E, the carrier tape CT may be removed from the first panel substrate 100P.

Referring to FIG. 9F, the first panel substrate 100P may be cut using a punching facility PM. The punching facility PM may cut the first panel substrate 100P such that the fingerprint sensor package 10 described with reference to FIGS. 2A to 2E is formed. As the first panel substrate 100P is cut, a plurality of first substrates (100 of FIG. 2C) may be formed from the first panel substrate 100P. In order to efficiently prevent cracks that may occur in a process of cutting the first panel substrate 100P using the punching facility PM, the punching facility PM may cut the first panel substrate 100P such that corners of the first substrate 100 have a rounded shape.

Referring to FIG. 9G, a card body 500 including a card substrate 520, a connection pad 530, and the security chip 11 may be prepared.

The card body 500 may include a groove region 510 for mounting the fingerprint sensor package 10. The card substrate 520 and the security chip 11 for storing financial information may be disposed on the card body 500. For example, an FPCB may be used as the card substrate 520. The security chip 11 may be mounted on the card substrate 520. The security chip 11 may be disposed in the card body 500 such that a surface thereof is exposed to the outside. In addition, the connection pad 530 for electrical connection between the fingerprint sensor package 10 and other components in the card body 500 may be disposed on the card substrate 520. The connection pad 530 may include a conductive material. The fingerprint sensor package 10 may be aligned with the groove region 510 of the card body 500, such that the upper surface 200U of the second substrate 200 may be exposed to the outside.

Referring to FIG. 9H, the fingerprint sensor package 10 may be mounted on the card body 500. A portion of the fingerprint sensor package 10 may be accommodated in the groove region 510 of the card body 500. The molding layer 350 of the fingerprint sensor package 10 may be accommodated in the groove region 510, and the external connection pads 130 of the first substrate 100 may be bonded to the connection pads 530 of the card substrate 520. Accordingly, the external connection pads 130 of the first substrate 100 may be physically and electrically connected to the connection pads 530 of the card substrate 520. In some example embodiments, the groove region 510 may be not completely filled by the molding layer 350 of the fingerprint sensor package 10, and a flow space S may be formed between the molding layer 350 of the fingerprint sensor package 10 and the card body 500. The flow space S may provide a space in which the fingerprint sensor package 10 is flexibly respondable depending on a degree of bending of the smart card 1. In other example embodiments, the flow space S may be filled by applying an adhesive.

Referring back to FIG. 1, the smart card 1 may include the fingerprint sensor package 10, the security chip 11, the display unit, and the power button 13. When a user brings a fingerprint into contact with the fingerprint sensor package 10 of the smart card 1, the fingerprint in contact may be recognized. When the recognized fingerprint and a registered fingerprint correspond to each other, the security chip 11 may grant a payment right to the user of the smart card 1.

While aspects of example embodiments have been shown and described above, it will be apparent to those skilled in the art that modifications and variations could be made without departing from the scope of or the following claims.

What is claimed is:

1. A fingerprint sensor package comprising:
   a first substrate comprising a core insulating layer having a first surface and a second surface opposing each other, the first substrate further comprising a through-hole passing through the first surface and the second surface, a first bonding pad disposed on the second surface of the core insulating layer along a circumference of the through-hole, and an external connection pad disposed between an edge of the second surface of the core insulating layer and the first bonding pad;
   a second substrate disposed in the through-hole of the core insulating layer and comprising a plurality of first sensing patterns, the plurality of first sensing patterns being spaced apart from each other in a first direction and extending in a second direction intersecting the first direction, a plurality of second sensing patterns spaced apart from each other in the second direction and extending in the first direction, and a second bonding pad;
   a conductive wire connecting the first bonding pad and the second bonding pad;
   a controller chip disposed on the second substrate; and
   a molding layer disposed on the second surface of the core insulating layer, filling the through-hole, covering the second substrate and the first bonding pad, and spaced apart from the external connection pad.

2. The fingerprint sensor package of claim 1, wherein the first substrate further comprises a ground bezel extending on the first surface of the core insulating layer along the circumference of the through-hole.

3. The fingerprint sensor package of claim 1, wherein the second substrate further comprises:
   a base layer;
   a lower insulating layer on a lower surface of the base layer; and
   an upper insulating layer on an upper surface of the base layer,
   wherein the plurality of first sensing patterns are disposed on the upper surface of the base layer,
   wherein the plurality of second sensing patterns are disposed on an upper surface of the upper insulating layer, and
   wherein the second bonding pad and the controller chip are disposed on a lower surface of the lower insulating layer.

4. The fingerprint sensor package of claim 3, further comprising:
   an upper protective layer covering the upper surface of the upper insulating layer; and a lower protective layer covering the lower surface of the lower insulating layer.

5. The fingerprint sensor package of claim 4, wherein the upper protective layer comprises a first material having a first hardness the lower protective layer comprises a second material having a second hardness, and
wherein the first hardness is greater than the second hardness.

6. The fingerprint sensor package of claim 4, wherein an upper surface of the upper protective layer and an upper surface of the first substrate are coplanar.

7. The fingerprint sensor package of claim 4, wherein a side surface of the upper protective layer is spaced apart from a side surface of the second substrate, and
wherein the molding layer covers an upper surface of the second substrate.

8. The fingerprint sensor package of claim 1, wherein a distance between a side surface of the through-hole and a side surface of the second substrate is in a range of about mm to about 3.0 mm.

9. The fingerprint sensor package of claim 1, wherein the molding layer overlaps the first substrate in a range of about 0.1 mm to about 3.0 mm from an edge of the through-hole of the first substrate.

10. A fingerprint sensor package comprising:
a first substrate comprising a core insulating layer having a first surface and a second surface opposite to each other, the first substrate further comprising a through-hole passing through the first surface and the second surface, a ground bezel disposed on the first surface of the core insulating layer along a circumference of the through-hole, a first bonding pad disposed on the second surface of the core insulating layer along the circumference of the through-hole, and an external connection pad disposed between an edge of the second surface of the core insulating layer and the first bonding pad;
a second substrate disposed in the through-hole of the core insulating layer and comprising a plurality of first sensing patterns spaced apart from each other in a first direction and extending in a second direction intersecting the first direction, a plurality of second sensing patterns spaced apart from each other in the second direction and extending in the first direction, and a second bonding pad;
a conductive wire connecting the first bonding pad and the second bonding pad
a controller chip disposed on the second substrate;
connection bumps disposed between the second substrate and the controller chip and electrically connecting the second substrate and the controller chip; and
a molding layer covering the second substrate and the controller chip, filling a space between the through-hole and a side surface of the second substrate, and extending to a boundary between the second bonding pad and the external connection pad,
wherein the plurality of first sensing patterns and the plurality of second sensing patterns are spaced apart from each other in a third direction perpendicular to the first and second directions, and the plurality of first sensing patterns and the plurality of second sensing patterns are included in a plurality of capacitors.

11. The fingerprint sensor package of claim 10, wherein the second substrate further comprises:
a base layer;
a lower insulating layer on a lower surface of the base layer; and
an upper insulating layer on an upper surface of the base layer,
wherein the plurality of first sensing patterns is disposed on the upper surface of the base layer,
wherein the plurality of second sensing patterns is disposed on an upper surface of the upper insulating layer, and
wherein the second bonding pad and the controller chip are disposed on a lower surface of the lower insulating layer.

12. The fingerprint sensor package of claim 11, wherein the second substrate further comprises:
a first ground pattern on the lower surface of the lower insulating layer;
a second ground pattern disposed on the lower surface of the base layer and electrically connected to the first ground pattern;
a third ground pattern disposed on the upper surface of the base layer and electrically connected to the second ground pattern; and
a fourth ground pattern disposed on the upper surface of the upper insulating layer and electrically connected to the third ground pattern,
wherein the fourth ground pattern surrounds the plurality of second sensing patterns in a planar manner.

13. The fingerprint sensor package of claim 12, wherein the second substrate further comprises:
a first conductive via extending in the lower insulating layer in the third direction;
a second conductive via extending in the base layer in the third direction and connected to the first conductive via;
a third conductive via extending in the base layer in the third direction and connected to the second conductive via; and
a fourth conductive via extending in the upper insulating layer in the third direction and connected to the upper insulating layer,
wherein the first to fourth conductive vias electrically connect the first ground pattern and the fourth ground pattern to each other, and
wherein the first to fourth conductive vias are tapered toward a central portion thereof in a thickness direction of the base layer.

14. The fingerprint sensor package of claim 10, further comprising:
an inner molding layer covering the controller chip,
wherein the second bonding pad is in an opening of the inner molding layer.

15. The fingerprint sensor package of claim 10, wherein the first substrate has a substantially rectangular planar shape and rounded corners.

16. The fingerprint sensor package of claim 10, wherein the through-hole has a substantially rectangular planar shape and tapered corners.

17. The fingerprint sensor package of claim 10, wherein the through-hole has a substantially rectangular planar shape and rounded corners.

18. The fingerprint sensor package of claim 10, wherein the molding layer has a convex lower surface, and
wherein a thickness of the molding layer in the third direction from an upper surface of the molding layer to a central portion of the lower surface of the molding layer is greater than a thickness of the molding layer in the third direction from the upper surface of the molding layer to a portion of the lower surface of the molding layer that is aligned with a sidewall of the second substrate.

19. A smart card comprising:
a card body comprising a groove region and a connection pad;
a security chip disposed in the card body; and
a fingerprint sensor package configured to sense a fingerprint of a user and to transmit a signal related to a sensing result to the security chip,
wherein the fingerprint sensor package comprises:
- a first substrate comprising a core insulating layer having a first surface and a second surface opposing each other, the first substrate further comprising a through-hole passing through the first surface and the second surface, a first bonding pad disposed on the second surface of the core insulating layer along a circumference of the through-hole, and an external connection pad disposed between an edge of the second surface of the core insulating layer and the first bonding pad;
- a second substrate disposed in the through-hole of the core insulating layer, the second substrate comprising a plurality of first sensing patterns spaced apart from each other in a first direction, and extending in a second direction intersecting the first direction, a plurality of second sensing patterns spaced apart from each other in the second direction and extending in the first direction, and a second bonding pad;
- a conductive wire connecting the first bonding pad and the second bonding pad;
- a controller chip disposed on the second substrate; and
- a molding layer disposed on the second surface of the core insulating layer, filling the through-hole, covering the second substrate and the first bonding pad, and spaced apart from the external connection pad, and wherein the external connection pad of the first substrate is bonded to the connection pad of the card body.

20. The fingerprint sensor package of claim 19, wherein an upper surface of the first substrate and an upper surface of the second substrate are coplanar.

* * * * *